United States Patent [19]

Maeda et al.

[11] Patent Number: 5,101,303
[45] Date of Patent: Mar. 31, 1992

[54] PEAK POSITION DETECTING METHOD AND PEAK POSITION DECIDING METHOD IN MAGNETIC PLAYBACK APPARATUS

[75] Inventors: Yutaka Maeda; Kiyotaka Kaneko; Izumi Miyake; Yoshio Nakane; Hiroshi Shimaya, all of Tokyo, Japan

[73] Assignee: Fuji Photo Film Co., Ltd., Kanagawa, Japan

[21] Appl. No.: 327,138

[22] Filed: Mar. 22, 1989

[30] Foreign Application Priority Data

Mar. 22, 1988 [JP] Japan .................................. 63-65630
Mar. 22, 1988 [JP] Japan .................................. 63-65631

[51] Int. Cl.⁵ ............................................ G11B 5/596
[52] U.S. Cl. ................................. 360/75; 360/77.06; 360/77.04
[58] Field of Search ............... 360/75, 77.02, 77.06, 360/77.04; 369/32, 44.27, 44.33

[56] References Cited

U.S. PATENT DOCUMENTS 4,710,832 12/1987 Itoh ............................... 360/77.02 X Primary Examiner—Vincent P. Canney
Assistant Examiner—David L. Robertson

[57] ABSTRACT

A search range for detecting the peak position of an envelope on a rotating magnetic recording medium is limited to a predetermined range on either side of an absolute track position of each track on the recording medium. A limitation is also placed upon the number of times a magnetic head is fed within this predetermined range. If a peak cannot be decided even when the magnetic head is fed the limited number of times, the final position of the magnetic head is adopted compulsorily as the peak position. As a result it is possible to reduce the time needed for peak position detection processing. When an envelope cannot be detected with the predetermined range, the absolute track position is adopted as the peak position.

26 Claims, 12 Drawing Sheets

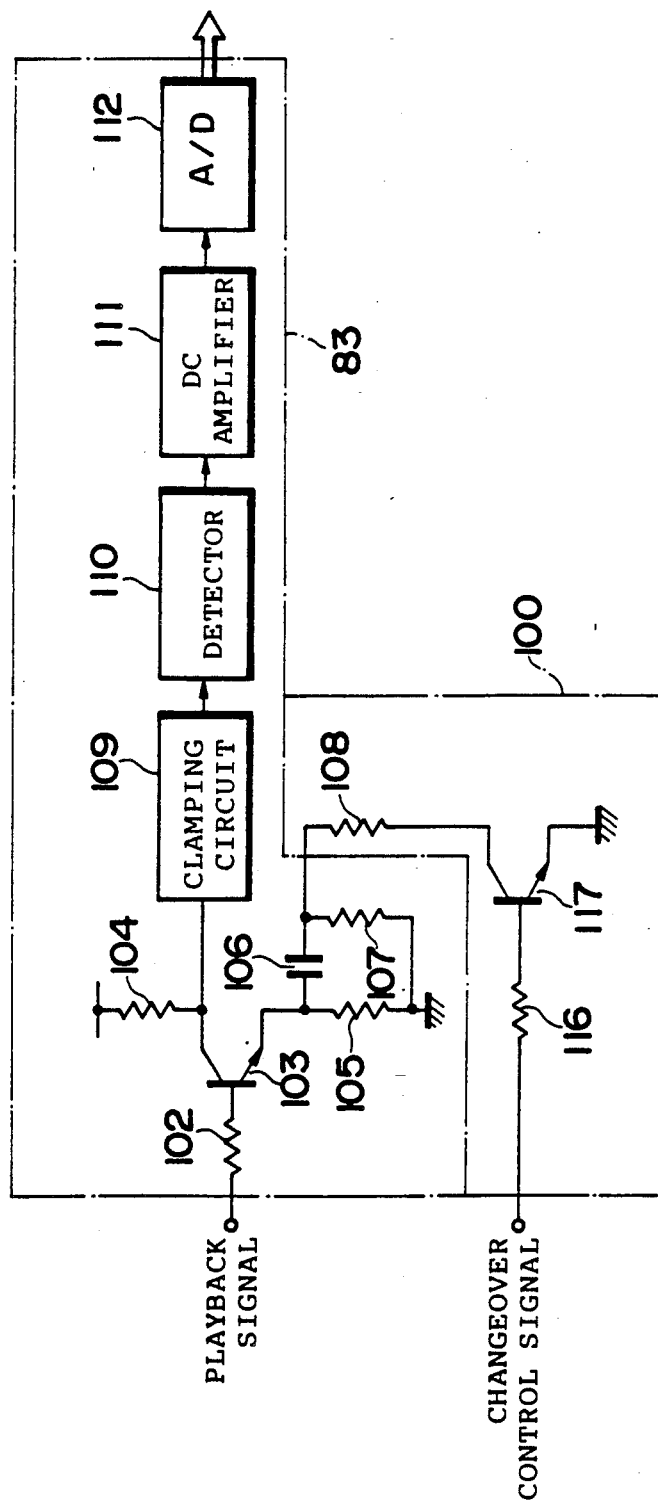

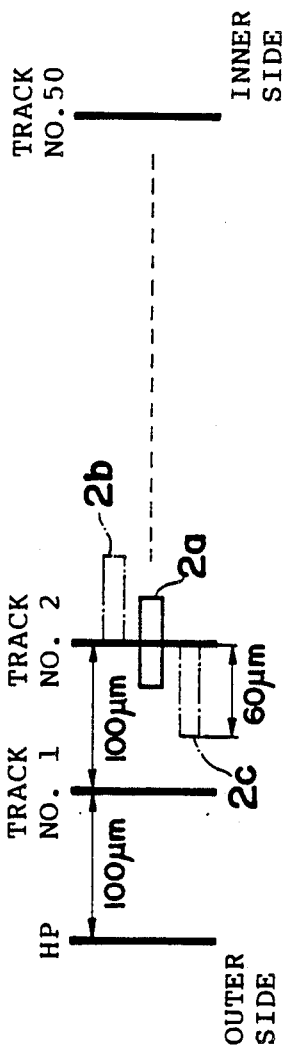
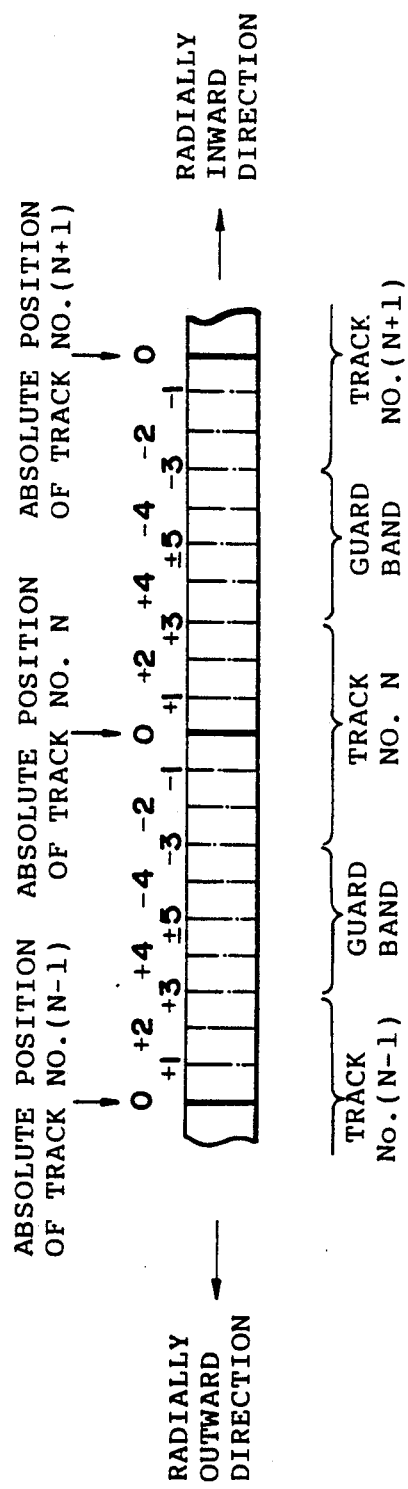

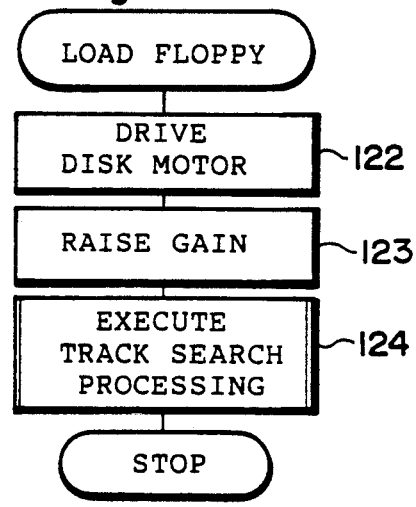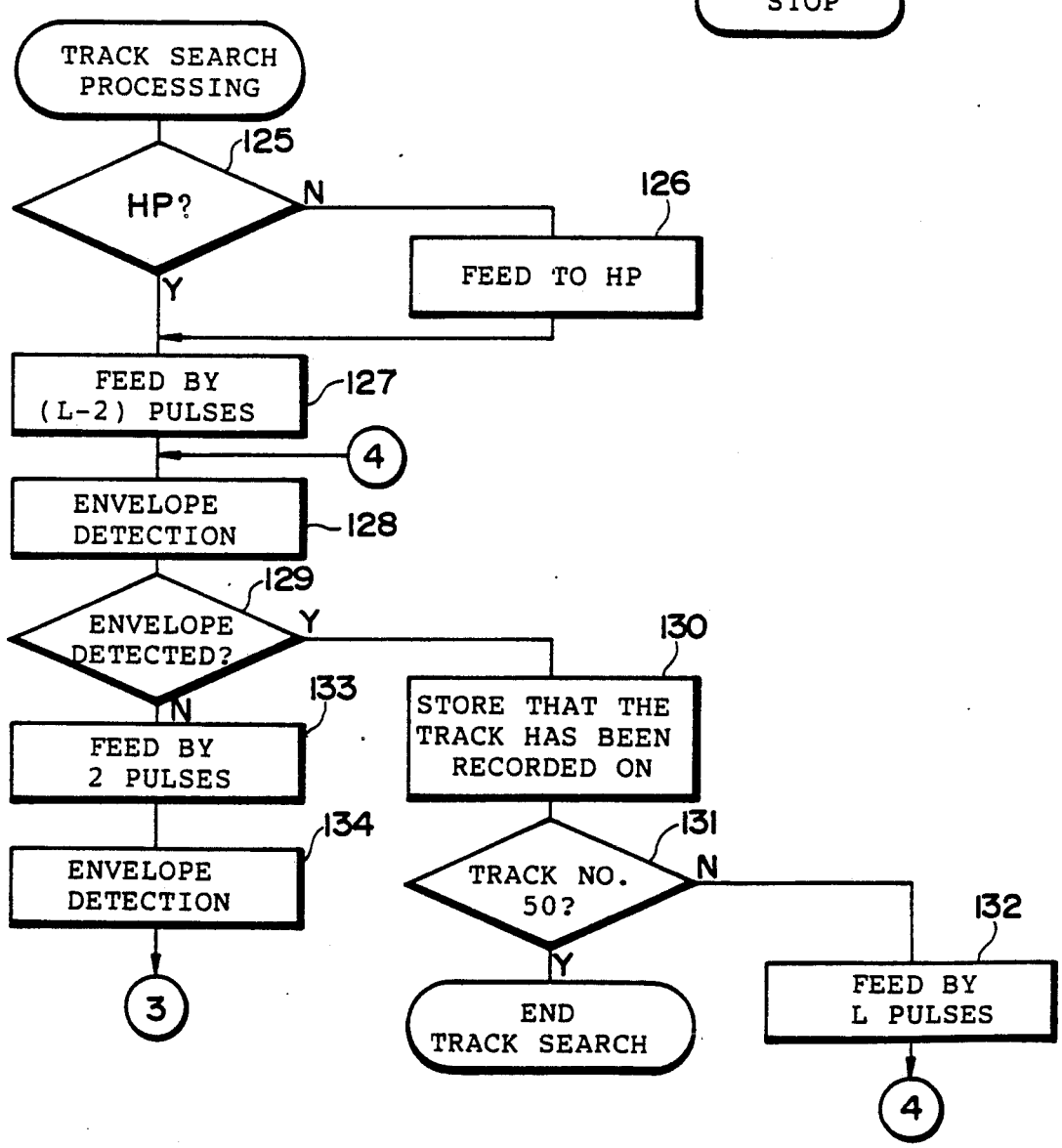

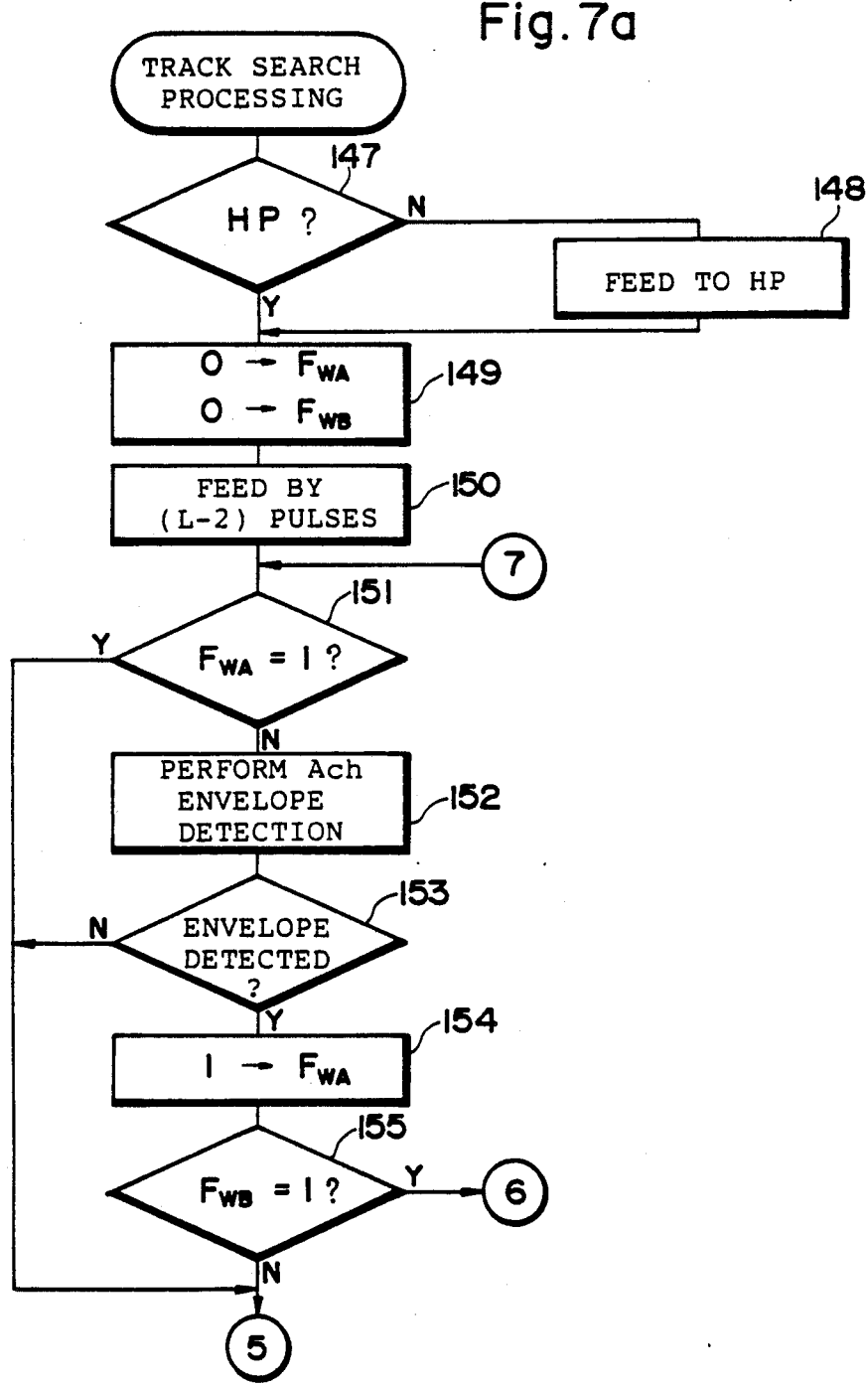

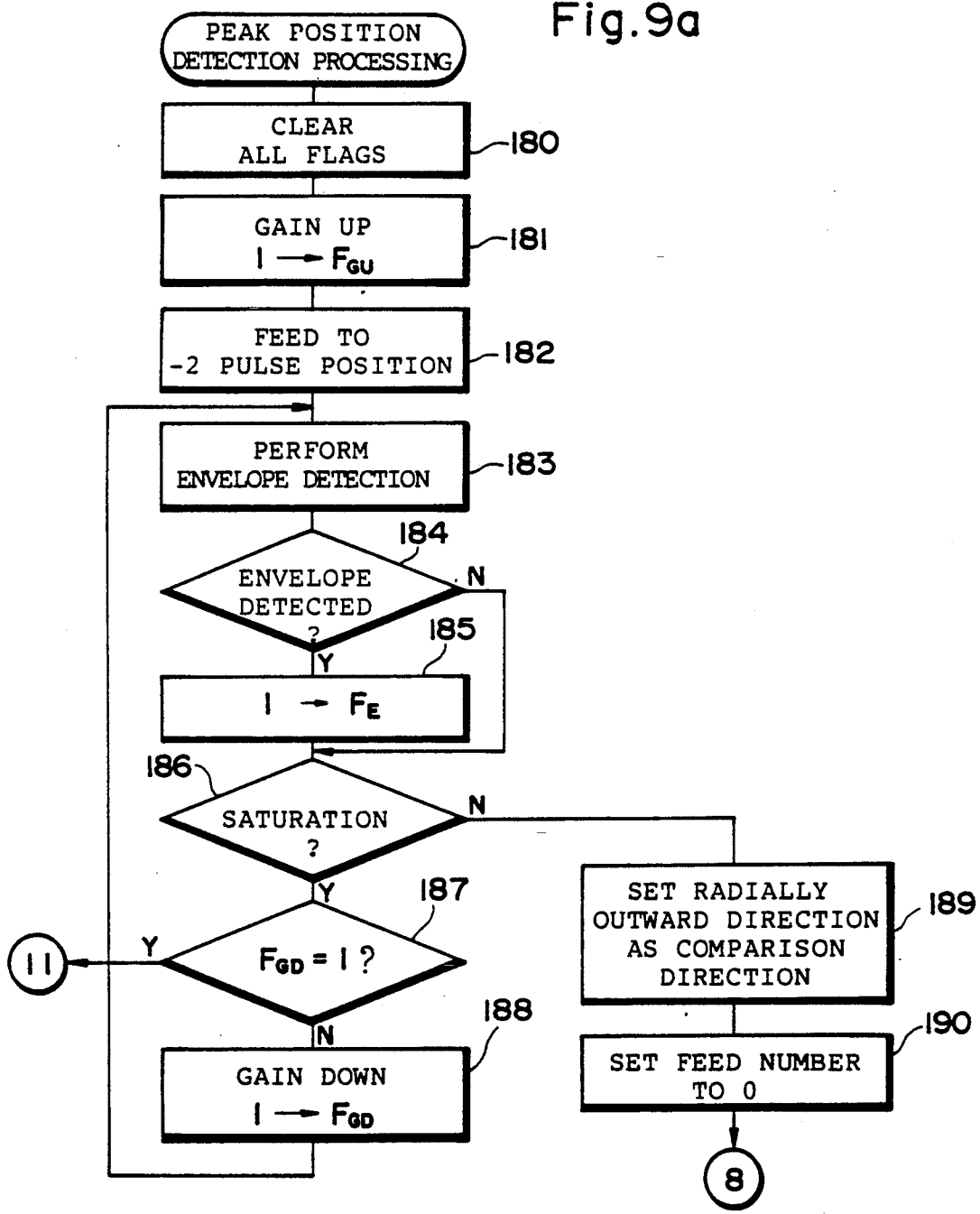

PEAK POSITION DETECTING METHOD AND PEAK POSITION DECIDING METHOD IN MAGNETIC PLAYBACK APPARATUS

BACKGROUND OF THE INVENTION

This invention relates to a magnetic playback apparatus for playing back, by a magnetic head, a signal recorded on a rotating magnetic recording medium (e.g., a video floppy) and, more particularly, to methods of detecting and deciding the peak position of an envelope of a recorded signal necessary for positioning the magnetic head at the center of a recorded track in order to achieve excellent recorded signal playback.

The magnetic playback apparatus mentioned here is a concept which includes a magnetic recording apparatus having a playback function (e.g., a still-video camera), a magnetic playback apparatus having a recording function, and a magnetic recording/playback apparatus.

Recording of a still-video signal on a video floppy (a magnetic recording medium) in a still-video camera is carried out by positioning a magnetic head on an absolute track position in accordance with an absolute track address system. On the other hand, a video floppy undergoes expansion and contraction due to environmental changes, especially changes in temperature and humidity. As a result, some deviation or offset occurs between the center of a recorded track on a video floppy and the absolute track position.

In playing back a still-video signal, it is desired that the best signal having little noise be read from the video floppy. In order to achieve this, it is necessary that the center of the magnetic head be made to coincide with the center of the portion of the video floppy on which the signal is actually recorded. At a recorded track on a video floppy, it is required to execute processing for detecting the peak position of the envelope of the read signal obtained when the magnetic head is fed in the diametric direction (i.e., across the track). This is peak position detection processing and is performed by comparing detected envelope levels at neighboring envelope detection positions and moving the magnetic head in the direction of the higher envelope level.

Conventionally, feed of the magnetic head and measurement of the detected envelope value are repeated until the peak position is decided. In actuality, since a change occurs in the envelope level detected even at the same position, it is not easy to decide where the peak position is located and therefore peak position detection processing requires a comparatively long period of time.

In the aforementioned peak position detection processing, peak position cannot be detected when no envelope is detected at all or when the envelope does not attain a prescribed level.

Though it can be considered that a signal has not been recorded on a track when no envelope is detected at that track, there is a case in which it can be surmised that a signal should be recorded on the track despite the absence of the envelope.

Specifically, consider a case in which the apparatus is a still-video camera having a playback function. In a still-video camera, an imaged video signal can only be recorded on a blank track of the video floppy. In order to readily determine whether each track has been recorded on or whether each track is blank, a track search is performed within the camera when a video floppy is loaded or when one video floppy is exchanged for another, and the results of the track search are preserved in the form of a track map.

If a designated track is a recorded track, an operation for playing back this track is performed in the playback mode. The abovementioned peak position detection processing is performed at the beginning of this playback operation. Despite the fact that the track is determined to be a recorded track in the track search processing, there are occasions where an envelope can fail to be detected at the same track in peak position detection processing because of poor contact between the magnetic head and the magnetic disk, or for some other reason. In any event, even in this case the position of the center of the track must be decided in order to make the transition to the playback operation.

SUMMARY OF THE INVENTION

An object of the present invention is to provide a method through which it is possible to shorten the time needed for detecting the peak position of an envelope at each track of a rotating magnetic recording medium.

Another object of the present invention is to provide a method through which the peak position of an envelope on a recording medium can be decided even if the envelope fails to be detected.

According to the present invention, the foregoing object is attained by providing a method of detecting a peak position in a magnetic playback apparatus, comprising the steps of previously determining a search range using an absolute track position of a magnetic recording medium as a reference, previously determining an upper limit on a number of times a magnetic head is fed to a plurality of detection positions within the range, starting peak position detection processing from a previously determined prescribed position within the range, examining the peak position by detecting an envelope of a read signal of the magnetic head at each detection position while the magnetic head is fed diametrically to the magnetic recording medium, comparing detected envelopes at neighboring detection positions, deciding that the position at which a detected envelope is maximum is a peak position if this maximum position is detected by the time that the number of times the magnetic head is fed attains the upper limit, and adopting a final position to which the magnetic head is fed as a pseudo-peak position if a peak position cannot be decided by the time that the number of times the magnetic head is fed attains the upper limit or even if the magnetic head reaches a limit of the search range.

This embodiment of the present invention is premised on the fact that the position of the center of a recorded track (the peak position of the envelope of the track) can be predicted to lie within a prescribed range the center of which is the absolute track position, even if the magnetic recording medium undergoes some expansion or contraction due to a change in the outside environment. In other words, according to the invention, the range over which envelope detection is performed at each track is limited to a predetermined range on either side of the absolute track position. Further, according to the invention, a limitation is also placed upon the number of times that the magnetic head is fed. This is for the purpose of preventing the magnetic head from continuing to be reciprocated repeatedly back and forth within the predetermined range. On the condition that this range and the limitation upon the number of head feeding operations are adopted, the optimum starting position of detection processing decides itself, so that peak position detection processing can begin from this position.

If the position at which the envelope has a maximum value can be detected within the above limits, it is decided that this position is the peak position. If the peak position cannot be decided within the abovementioned limited range or within the limited number of head feeding operations, the last position to which the magnetic head is fed is adopted as a pseudo-peak position according to the invention. Even if a pseudo-peak position is thus adopted, almost no difficulties are encountered, and the magnetic head can be positioned substantially at the appropriate position, if the aforementioned conditions are observed. Adopting the foregoing method makes it possible to shorten the time needed to detect the peak position of an envelope.

Further, according to the present invention, there is provided a method of deciding peak position in a magnetic playback apparatus, comprising the steps of previously determining a search range using an absolute track position of a magnetic recording medium as a reference, examining a peak position by detecting an envelope of a read signal of a magnetic head at each detection position while the magnetic head is fed diametrically to the magnetic recording medium within the abovementioned range comparing detected envelopes at neighboring detection positions within the abovementioned range, and deciding that an absolute track position is a peak position when an envelope cannot be detected within the abovementioned range (inclusive of a case where an envelope having a level necessary for peak position detection processing cannot be detected with this range).

This embodiment of the present invention is premised on the fact that the position of the center of a recorded track (the peak position of the envelope of the track) can be predicted to lie within a prescribed range of the center, which is the absolute track position, even if the magnetic recording medium undergoes some expansion or contraction due to a change in the outside environment. In other words, according to the invention, the range over which envelope detection is performed at each track is limited to a predetermined range on either side of the absolute track position. According to the invention, if a position at which an envelope peaks can be detected within the abovementioned range, it is decided that this position is the peak position.

If an envelope cannot be detected within the abovementioned range, the absolute track position is decided to be the peak position according to the invention. Even though the absolute track position is regarded as the peak position and the magnetic head is situated at this position, no large error will result and playback will be possible if a signal has been recorded on this track.

Thus, according to the present invention, a magnetic head can be positioned to allow a playback operation even if an envelope is not detected.

Once a signal playback operation has been initiated, subsequent actions are left to the operator of the playback apparatus regardless of whether or not a playback signal contains information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a circuit diagram illustrating an envelope detector circuit and a gain changeover circuit;

FIG. 3 is a view illustrating the arrangement of tracks on a video floppy;

FIG. 4 is an enlarged view of tracks illustrating the relationship between the tracks and the steps through which a magnetic head is fed;

FIG. 5 is a flowchart illustrating a procedure for raising gain in track search, processing;

FIGS. 6a and 6b, are flowcharts illustrating a procedure for performing track search processing one track at a time using one magnetic head;

FIGS. 7a through 7c are flowcharts illustrating a procedure for performing track search processing two tracks at a time using two magnetic heads;, FIGS. 9a through 9c are flowcharts illustrating a processing procedures for peak position detection.

DESCRIPTION OF THE PREFERRED EMBODIMENT

(1) System Construction

Figure 1:
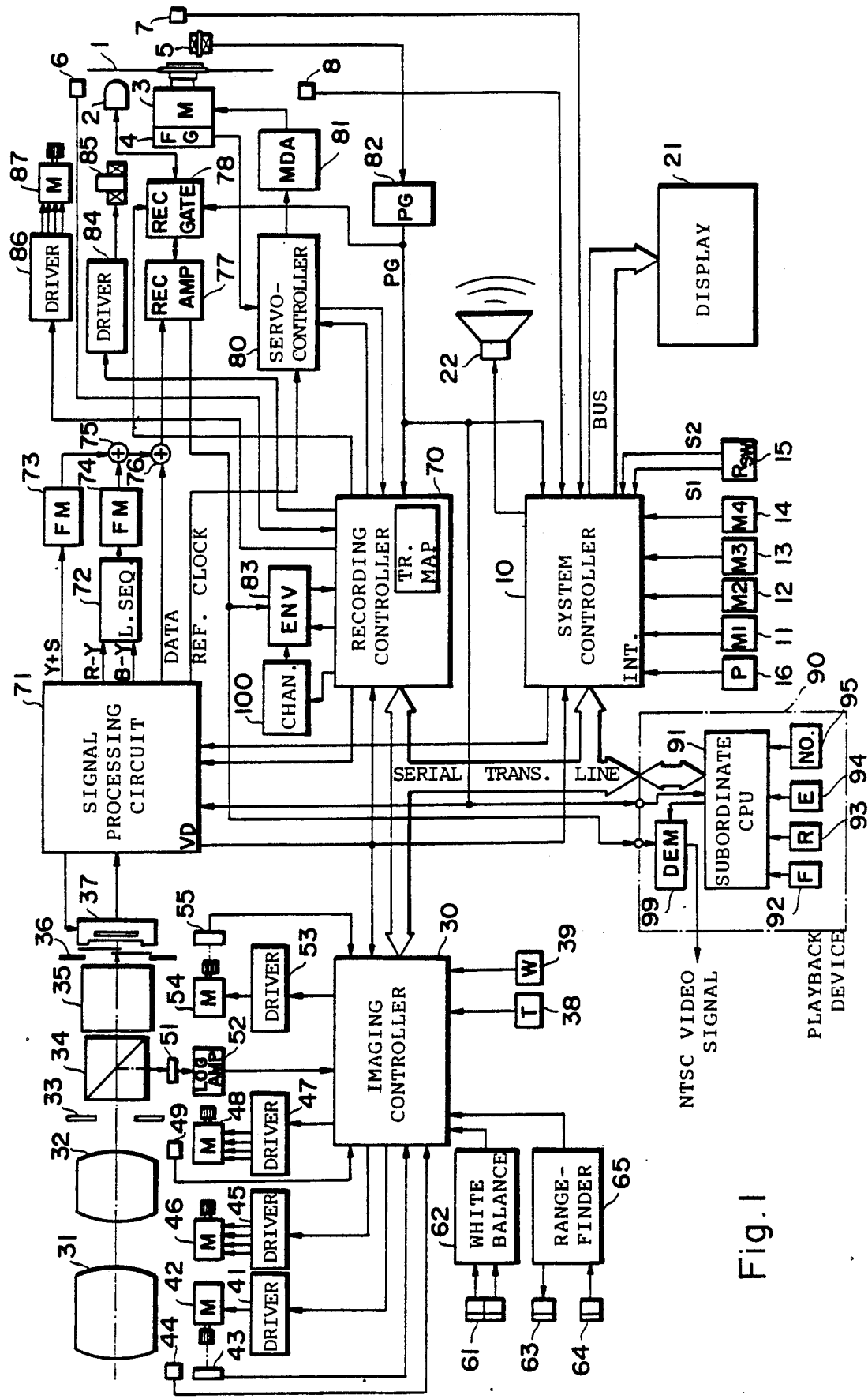
FIG. 1 is a block diagram illustrating the construction of a still video camera system.

FIG. 1 illustrates the construction of a still video camera system.

This still video camera is controlled by three controllers, namely a system controller 10, an imaging controller 30 and a recording controller 70. Each of the controllers 10, 30 and 70 includes a CPU (e.g., a microprocessor), memories (a RAM, ROM, etc.) for storing the program executed by the CPU as well as the necessary data, and the required interface circuit. The CPU of the system controller 10 is a main CPU for controlling the overall operation of the still video camera. The CPUs of the imaging controller 30 and the recording controller 70 are subordinate CPUs, which operate in accordance with commands from the main CPU. The imaging controller 30 performs a control related to such photographic functions as focusing, f-stop, shutter speed and zoom. The recording controller 70 performs a control, which is related to recording a still-video signal on a video floppy (magnetic disk) 1 and playback of the video signal from the video floppy, such as driving of a disk motor 3, loading/unloading a magnetic head 2, feeding the magnetic head 2, track search processing, processing for detecting a recorded signal peak position, and gain changeover of read signals in the above processing operations. The controllers 10, 30, and 70 are interconnected by a serial transmission line and communicate with one another.

A playback device (playback adapter) 90 can also be connected. The playback device 90 demodulates a still-video signal read out of the video floppy 1, converts the signal into a color still-video signal in the NTSC format, for example, and outputs the converted signal. The playback device 90 also includes a CPU and a memory, this CPU is being positioned as a subordinate CPU with respect to the main CPU.

A still-video camera is provided with a bucket which can be freely opened and closed. The video floppy 1 is inserted into the opened bucket. When the bucket is subsequently closed, the video floppy 1 is chucked onto the spindle of the disk motor 3.

The video floppy 1 is provided with a plurality (e.g. 50) of concentric, circular tracks (track pitch is 100 μm, by way of example). By imaging processing, one field or frame of a frequency-modulated color still-video signal (inclusive of a luminance signal and color difference signal, etc.) is magnetically recorded on one or two tracks. The 50 concentric, circular tracks provided on the magnetic recording surface of the floppy disk 1 are numbered consecutively from No. 1 to No. 50 from the outer to the inner side thereof. A home position HP (an origin position or a standby position) is located on the outer side of Track No. 1, and an end position EP is situated on the inner side of Track No. 50. The tracks will be described in greater detail hereinbelow.

Applied as inputs to the system controller 10 are switch input signals from a power supply switch 16, various mode switches 11–14 and a shutter release button 15, a detection signal from a bucket switch 7 which detects whether the bucket for accommodating the video floppy 1 is open or closed (and, if necessary, whether or not the video floppy is present within the bucket), and a detection signal from a condensation sensor 8 which measures the humidity near the location at which the video floppy 1 is loaded. Modes which can be set include a frame/field mode indicative of frame recording or field recording, a skip mode for providing the video floppy with blank tracks where a recording is not made, and an edit mode for performing recording on the blank tracks. The set modes, the track numbers which are to be recorded on and other information are displayed on a liquid crystal display device 21. The display device 21 is connected to the system controller by a bus. When condensation or some other abnormality occurs, a buzzer 22 is sounded. It is also permissible for the display device 21 to display the fact that condensation has been detected.

The power supply switch 16 is of the push-button type. When the switch is pressed, a pulse-shaped switch-on signal is applied to the main CPU of the system controller 10 as an interrupt signal.

The shutter release button 15 is of the two-stage stroke type. A switch S1 is closed by pressing the button 15 over the first stage of its stroke, and a switch S2 is closed by pressing the button 15 over the second stage of its stroke. The disk motor 3 is driven into operation when the switch S1 is closed, and both imaging and recording are performed when the switch S2 is closed.

The imaging optical system includes a zoom lens system 31, an imaging lens system 32 for forming the image of a subject, a diaphragm 33, a beam splitter 34 for deflecting part of an incident light beam so that this part of the beam will impinge upon a photometric element 51, an infrared shielding filter 35, and a shutter 36. An illumination detection signal from the photometric element 51 is inputted to the imaging controller 30 via a logarithmic amplifier 52. The imaging controller 30 is operative to perform processing for calculating an f-stop value and a shutter speed based on the intensity of illumination of the incident light detected by the photometric element, controlling the diaphragm 33 based on the f-stop value decided, and controlling the opening and closing of the shutter 36 based on the shutter speed decided. The opening and closing of the diaphragm 33 is carried out by a diaphragm motor 48 driven by a driver 47. Also provided is a switch 49 for detecting opening and closing limit positions of the diaphragm 33. Latch release of the front and rear curtains of the shutter 36 and wind-up thereof are executed by a shutter drive unit which includes a shutter motor 54 driven by a driver 53. The angle of rotation of the motor 54 is detected by a rotary encoder 55 and fed back to the controller 30.

A color detection signal from a color sensor 61 is fed into the controller 30 after being subjected to predetermined processing by a white-balance processing circuit 62. The white-balance data is used in order to control the amplification gain of R, G and B signals in a variable-gain amplifier circuit, described below, of a signal processing circuit 71.

In order to measure the range to the subject, an infrared light-emitting diode 63 and a light-receiving element 64 for receiving the reflected light are provided. Data indicative of the range to the subject is obtained by a rangefinding circuit 65 based on the output signal from the light-receiving element 64. An auto-focusing motor 46 is driven via a driver 45 under the control of the controller 30 using the range data, whereby focusing control is performed.

In response to signals from a telephoto switch 38 and a wide-angle switch 39 for inputting the degree of zoom, a motor 42 is driven by the controller 30 via a driver 41 to set a prescribed zoom magnification. The angle of the rotation of motor 42 is detected by a rotary encoder 43 and fed back to the controller 30.

Disposed in the focal plane of the imaging optical system is a solid-state electronic image pick-up device 37, for the three primary colors, including a two-dimensional image pick-up cell array such as an array of CCDs. Image data stored in the image pick-up device 37 when the shutter 36 opens is read out as a serial still-video signal (R, G and B) in synchronization with vertical and horizontal synchronizing signals provided by a signal processing circuit 71. This serial signal is fed into the signal processing circuit 71.

The signal processing circuit 71 includes an oscillator circuit from the output signal of which a vertical reference signal VD and a reference clock signal are formed and outputted. The vertical reference signal VD is applied to the system controller 10, the imaging controller 30 and the recording controller 70 to serve as a reference for the operation timing of each of these devices. The reference clock signal is applied to a servo-control circuit 80. As will be described below, a phase pulse PG which represents the reference phase of rotation of the video floppy 1 is applied to the signal processing circuit 71, the system controller 10, the recording controller 70 and the playback device 90. In response to a reset signal from the recording controller 70, the signal processing circuit 71 adjusts the vertical reference signal VD in such a manner that it will maintain a constant phase relation with regard to the phase pulse PG. In addition, the signal processing circuit 71 generates the vertical and horizontal synchronizing signals, which possess a constant phase relation with regard to the phase pulse PG.

Further, the signal processing circuit 71 is equipped with a preamplifier circuit to which the still-video signal (R, G and B) is applied, a variable-gain amplifier circuit (white-balance adjusting circuit) and a process matrix circuit. A luminance signal Y (on which a synchronizing signal S is superposed) and two color difference signals R−Y and B−Y are formed within the process matrix circuit. These color difference signals R−Y and B−Y are line-sequenced every 1H by a line sequencing circuit 72. The luminance signal Y and the line-sequenced color difference signal are directed through pre-emphasis circuits (not shown) and then applied to frequency modulator circuits 73 and 74, where the signals are frequency modulated at respective frequency bands which differ from each other. The resulting frequency-modulated signals are combined in a mixing circuit 75.

It is possible for additional information to be recorded on tracks of the floppy disk 1. The additional information mentioned here refers to an audio signal (which represents a voice for narration, music, etc.) and a display signal (which represents character information for example). This additional information signal enters the signal processing circuit 71 from a microphone or other input device (not shown) to be converted into a predetermined format before being delivered to the line for the luminance signal Y. There are also cases where the additional information signal is superposed on the luminance signal Y. In a case where only the additional information signal is recorded on a predetermined track of the video floppy 1, this signal alone will be outputted.

It is possible to perform multiplexed recording of data on the video floppy 1. The multiplexed recorded data includes an initial bit, field/frame data, track address (No.) data, date data and data employed by the user. These items of data, which are provided by the system controller 10, are DPSK (differential phase shift keying)-modulated by the signal processing circuit 71 and are combined along with the abovementioned frequency-modulated video signal in the mixing circuit 76. The resulting signal is fed into a recording amplifier circuit 77.

The magnetic head 2 (two of which are provided at a spacing having positions on mutually adjacent tracks so as to make frame recording possible), which is for writing the still-video signal of the imaged subject on a predetermined track of the video floppy 1, is supported so as to be freely movable diametrically of the floppy disk 1, and is controlled so as to be fed in the same direction, by a feed drive controller. The latter includes a stepping motor 87 and a driver 86. The recording controller 70 provides the feed drive controller with instructions regarding the feeding direction and the amount of feed of the magnetic head 2. Also provided is a home position switch 6 for detecting that the magnetic head 2 has arrived at the home position HP. The detection signal from the switch 6 is applied to the recording controller 70.

A head loading device is provided in order to prevent the floppy disk 1 from becoming scarred due to prolonged contact between the magnetic head 2 and the magnetic disk 1 when the latter is at rest. Under the control of the recording controller 70, the head loading device, which includes a head loading solenoid 85 and a driver 84, displaces (advances and retracts) the magnetic head 2 in such a manner that the magnetic head 2 contacts the video floppy 1 only at recording or playback (when the video floppy 1 is rotating) or only when power is being introduced, and is separated from the video floppy 1 at all other times.

In order to provide good contact between the magnetic head 2 and the rotating video floppy 1, a regulating plate (not shown) is provided on the side of the video floppy opposite the magnetic head 2. Disposed adjacent the core of the video floppy 1 is a phase detector 5 which, by detecting the leakage flux from a permanent magnet for chucking purposes, senses when the video floppy 1 has arrived at a predetermined angular position, whereupon the detector 5 outputs a phase detection signal. The output detection signal of the phase detector 5 has its waveform shaped by a phase pulse generating circuit (waveform shaping circuit) 82, which delivers the signal as the phase pulse PG. This pulse is applied to the controllers 10, 70 and 90, the circuit 71 and a recording gate circuit 78, as mentioned above. One of the phase pulses PG is generated whenever the video floppy 1 makes one revolution.

The disk motor 3 is driven by the driver 81. The rotational speed (rpm) of the disk motor 3 is detected by a frequency generator 4, which outputs a detection signal whose frequency is proportional to the rotational speed of the motor 3. This signal enters the servo-control circuit 80. Based on the reference clock signal which enters from the signal processing circuit 71 and the frequency detection signal which enters from the detector 4, the servo-control circuit 80 controls the motor 3 so that it will rotate at a constant speed (e.g., 3,600 rpm). The servo-control circuit 80 also starts and stops the motor 3 in accordance with a command from the recording controller 70.

The still-video signal amplified by the recording amplifier circuit 77 enters the recording gate circuit 78. When a record command is issued by the recording controller 70, the recording gate circuit 78, in the case of field recording, is opened at the timing of the phase pulse PG applied thereto and remains open until the next phase pulse PG enters. As a result, the video signal and the like are applied to the magnetic head 2 to record a still-video signal, etc., on a predetermined track of the video floppy 1. This recording of the still-video signal is performed for only one revolution of the video floppy 1 in the case of field recording. In the case of frame recording, the gate circuit 78 is opened for two revolutions of the video floppy 1. A video signal of a first field is recorded on a certain track by one head 2 in the first revolution of the video floppy 1, and a video signal of a second field is recorded on the neighboring track by the other head 2 in the second revolution of the video floppy 1.

It is also possible for the magnetic head 2 to play back a video signal or the like from the video floppy 1. A frequency-modulated video signal or the like read from the magnetic head 2 is similarly amplified by the amplifier circuit 77 via the gate circuit 78 and then applied to an envelope detector circuit 83 and the playback device 90. This playback signal is employed in track search processing in the recording mode and not just in the playback mode.

The envelope detector circuit 83 detects the envelope of the read signal from the magnetic head 2, namely the envelope of the frequency-modulated video signal recorded on a track of the video floppy 1, and outputs a voltage signal conforming to the detected envelope. The circuit includes an A/D (analog/digital) converter, which converts the voltage signal representing the envelope into a digital quantity, namely an eight-bit digital signal representing a quantization level of, e.g., 256. This digital signal is fed into the recording controller 70.

As will be described later in greater detail with reference to FIG. 2, the gain of the envelope detector circuit 83 is changed over between two, i.e., high and low, stages by a changeover circuit 100. Changeover of the circuit 100 is controlled by a control signal from the recording controller 70.

The envelope detection signal is used in processing (track search processing) in which the recording controller 70 determines whether a track on the video floppy 1 is blank or already recorded on, and in processing (peak detection processing) for detecting a position at which a recorded signal at a track to be played back in the playback mode has been strongly recorded. The particulars will be described below in greater detail.

If necessary, the envelope detection signal may be used in recording check processing as well. Recording check processing refers to a check for determining whether a recording has indeed been made after an imaged still-video signal is recorded on a predetermined track by the magnetic head 2 in the manner described above. A decision is rendered to the effect that a recording has been made when the envelope detection signal is above a predetermined threshold level.

The playback device 90 is detachably mounted on the main body of the still-video camera. When the playback device 90 has been mounted on the still-video camera, a playback still-video signal line connected to the recording amplifier circuit 77, a line for the phase pulses PG and the serial transmission line are connected to the same lines on the side of the playback device 90 by a connector (not shown).

The playback device 90 includes, in addition to the abovedescribed CPU 91, a processing circuit 99 for processing the still-video signal from the playback still-video signal line of the still-video camera. The processing circuit 99 includes such circuits as a circuit for separating a luminance signal component and a color difference signal component, a field/frame converter circuit, a frequency demodulator circuit, a synchronizing circuit, and a DPSK demodulator circuit. The reproduced still-video signal is outputted as an NTSC format video signal through processing performed by the circuit 99. The circuit 99 outputs also the aforementioned additional information signal, data signal and the like.

The playback device 90 is further provided with a forward switch 92 which inputs a command for feeding the magnetic head one track in the forward direction, a reverse switch 93 for feeding the magnetic head 2 one track in the reverse direction, an erase switch 94 which inputs a command for erasing a signal recorded on the video floppy 1, and a track No. designating switch 95 for designating the number of a track at which the magnetic head 2 is to be positioned. By communicating with the system controller 10, the playback device 90 transmits the commands produced by these switches to the controller 10. The controller 10, by further communication, transmits the commands to the recording controller 70 so that the commanded operations are executed.

FIG. 2 illustrates a specific example of the envelope detector circuit 83 and its gain changeover circuit 100.

In the envelope detector circuit 83, the frequency-modulated video signal (playback signal) read from the video floppy 1 by the magnetic head 2 is applied to the base of a transistor 103 of a high-frequency (RF) amplifier circuit via a resistor 102. A resistor 105 is connected across ground and the emitter of the transistor 103, and a capacitor 106 and a resistor 107 are connected in parallel with the resistor 105. A resistor 104 is connected across the power supply and the collector of the transistor 103. The collector voltage is applied to a clamping circuit 109, which is the next stage, as the output of the amplifier circuit.

The clamping circuit 109 places the reference level of the output signal from the above-described amplifier circuit at a fixed level. The output of the circuit 109 is applied to a detecting (rectifying and smoothing) circuit 110, where envelope detection is performed. The resulting envelope signal is applied to the aforementioned A/D converter circuit 112 via a DC amplifier circuit 111. The digital signal resulting from the conversion is fed into the recording controller 70.

The changeover circuit 100 is adapted to change over the gain of the foregoing high-frequency amplifier circuit, which includes the transistor 103, between two, i.e., high and low, stages. The changeover circuit 100 includes a series circuit including a switching transistor 117 and a resistor 108. The series circuit is connected between ground and the junction of the capacitor 106 and the resistor 107 of the envelope detector circuit 83. The changeover control signal outputted by the recording controller 70 is applied to the base of the transistor 117 via a resistor 116.

The transistor 117 is turned on when the changeover control signal is at the H level and is turned off when the changeover signal reverts to the L level. When the transistor 117 turns on, the resistor 108 is connected in parallel with the impedance circuit connected to the emitter of the transistor 103 of the envelope detector circuit 83. Since the impedance of this circuit is thus reduced, the gain of the amplifier circuit diminishes in relative terms (gain-down). When the transistor 117 turns off, the resistor 108 no longer has any relation to the rest of the circuit, so that the gain of the amplifier circuit becomes relatively high (gain-up). By changing the level of the gain control signal applied to the changeover circuit 100, the gain in the envelope detector circuit 83 can be varied.

The gain-down state is the normal state. By setting the value of the resistor 108 to be fairly small, it is possible to make the ratio of gain at gain-down to the gain at gain-up ½ to ⅓.

As will be understood later, gain-up is set in track search processing. In peak position detection processing, gain-up is set, though the gain is turned down for peak detection when the A/D-converted value saturates.

(2) Track Search Processing

Track search processing, which is for determining whether each track on a video floppy is a recorded track or a blank track, is performed by the recording controller 70. A track map is originated based on the result of this track search processing. The track map, which is provided in the memory of the recording controller 70, includes data arrayed in accordance with the track number and indicates whether the particular track is blank or an already recorded track. If necessary, the track map is additionally provided with data indicating whether the still-video signal of a recorded track is a field recording or a frame recording, as well as with other data. Such a track map is used in order to readily determine whether there is a recorded signal on a track to be played back in the playback mode and whether a track to be recorded on in the editing mode is a blank track.

The track search processing is performed when a new video floppy is loaded or when video floppies are exchanged. Since the system controller 10 is in the ordinary operating state when the power supply of the still-video camera is on, loading and exchanging a video floppy can readily be detected based on an output signal from a switch such as the aforementioned bucket switch 7 or a switch which senses the presence of the video floppy. However, there are instances where a video floppy is loaded or changed when the power supply of the still-video camera is off. In order to deal with such a situation, it is preferred for the fact that a floppy has been loaded or changed be electrically or mechanically sensed and memorized. If such an expedient is adopted, track search processing will be executed as soon as the power supply is turned on.

Generally, in track search processing, the magnetic head 2 is fed across a track and the track is judged to be blank if the level of the detection signal in the envelope detector circuit 83 does not attain a prescribed threshold level. The track is judged to be a recorded track if the detection signal level does attain the threshold level. As will be set forth hereinafter, track search processing is executed in which this general approach is actualized by a specific approach.

Before describing a specific example of track search processing, the particulars which serve as the premise of this processing, namely the relationship between the track position and feeding the magnetic head 2, will be discussed. FIG. 3 illustrates the arrangement of tracks on the video floppy 1, and FIG. 4 illustrates the tracks in an enlarged form of the relationship between the tracks and the feeding steps of the magnetic head 2.

As set forth above, the structure of the video floppy 1 is such that the home position HP, track No. 1, track No. 2, ..., track No. 50 are arranged in the order mentioned from the outer periphery toward the inner periphery of the floppy. The width is 60 $\mu$m and the track pitch is 100 $\mu$m. The spacing between the home position HP and the track No. 1 is 100 $\mu$m. A guard band having a width of 40 $\mu$m is disposed between mutually adjacent tracks. The width of the magnetic head 2 in this embodiment is 60 $\mu$m.

The still-video camera employs an absolute track address system. The absolute track address system is one in which the position of each track and the home position of the video floppy 1 are determined by their distances from a reference position. The reference position is not determined in direct relation to the video floppy but in relation to the mechanism of the magnetic head feed drive controller on the side of the still-video, camera. For example, if the reference position is made to be the home position HP, this position will be stipulated by the home position switch 6 of the still-video camera.

A video floppy undergoes some expansion and contraction owing to such environmental conditions as temperature and humidity. In accordance with the absolute track address system, the position of a track on the video floppy 1 is determined by its distance from the reference position and is independent of expansion and contraction of the video floppy. As a consequence, some deviation can occur between the position on a floppy at which a video signal is actually recorded and a position determined by the absolute track address system. This becomes a problem at the time of playback and the details thereof will be described later.

Since each track has a width of 60 $\mu$m, as mentioned above, the position of the center of the track is used to indicate the track position. This is referred to as the "absolute track position". Similarly, the position of the center of the magnetic head 2 represents the position of the head proper.

As set forth above, the magnetic head 2 is fed by the feed drive controller, which includes the stepping motor 87. In this embodiment, the magnetic head 2 is fed 10 $\mu$m per shift pulse applied to the stepping motor 87. For the sake of the description to follow, positions inside and outside tracks will be expressed using the number of shift pulses applied to the stepping motor 87 as the units. These positions shall be referred to as "pulse positions".

The direction of feed of the magnetic head 2 from the outer periphery to the inner periphery of the floppy is taken as being the forward direction, and the direction of feed the opposite way is taken as being the reverse direction. As illustrated in FIG. 4, the origin of pulse positions is taken as being the absolute track position of each track, with the pulse number positions +1, +2, ..., +5 being assigned in the forward direction every shift pulse (every 10 $\mu$m), and the pulse number positions −1, −2, ..., −5 being assigned in the reverse direction every shift pulse (every −1 shift pulse in the forward direction).

Accordingly, by applying +10 pulses to the stepping motor 87, for example, the magnetic head 2 is fed by one track pitch in the forward direction, so that the head is fed radially inward from the track at which it is presently located to the next inwardly located track. Feeding the magnetic head 2a, which is located at the absolute track position, to a −3 pulse position, as illustrated in FIG. 3, shifts the magnetic head to the position indicated at 2c. By applying +3 pulses from this position, the magnetic head 2 returns to the −0 pulse position (absolute track position) indicated at 2a, and performing a feed by another +3 pulses situates the magnetic head 2 at the position 2b.

with reference to FIG. 5, if a video floppy is loaded or exchanged for another, or if it is found when the power supply switch 16 is turned on that loading or exchanging a floppy disk has been memorized, as described earlier, the system controller 10 notifies the recording controller 70 via the serial transmission line of the fact that track search processing is required. In response, the recording controller 70 sends a drive instruction to the driver 81 via the servo-control circuit 80. When this is done, the disk motor 3 begins operating to start rotation of the video floppy 1 chucked on the spindle of the motor 3 (step 122). Next, the L-level changeover control signal enters the changeover circuit 100 so that the gain of the envelope detector circuit 83 is raised (step 123). The recording controller 70 then executes track search processing (step 124).

Track search processing is merely for determining whether each track is a recorded track or a blank track and is not involved with the contents of a recorded signal or the precise position of the recorded signal. Accordingly, in order to shorten the time for this processing in combination with a method described below, the gain of the envelope detector circuit 83 is raised. Thereby, the A/D converter circuit 112 does not need to be necessarily high in precision, which allows satisfactory results to be obtained even with an A/D converter circuit having a low level of precision.

In a case where two magnetic heads 2 are provided, as mentioned earlier, two approaches are available. One is to perform track search processing using only one of the heads, and the other approach is to perform the processing using both heads.

In order to shorten the time needed for processing in either of these methods of track search processing, positions at which the envelope of the playback signal are detected are limited to the −2 pulse position, the 0 pulse position and +2 pulse position at each track, and envelope detection processing is performed in this order. If an envelope is detected at one location among these limited envelope detection positions, that track is judged to be a recorded track and envelope detection is not executed at the remaining detection positions associated with this track. (Hereinafter, the fact that an envelope has been detected shall correspond to the fact that the A/D-converted value of the envelope detection signal is above a prescribed level, and the fact that an envelope has not been detected shall be taken to mean that the A/D-converted value has not attained the prescribed level.) Further, envelope detection locations are present at a plurality of locations (e.g., at equi-angular intervals) in one revolution of the video floppy 1. If an envelope is detected at even one of these locations, envelope detection is not carried out at the other locations.

In track search processing, the magnetic head 2 is fed radially inward from the home position HP (which corresponds to track No. 0). The magnetic head is positioned first at the −2 pulse position of each track. If an envelope is detected at this position, the envelope detection processing at this track ends and the magnetic head 2 is fed to the next track. If an envelope is not detected, then the magnetic head is fed to the 0 pulse position. If an envelope is not detected at the 0 pulse position, then the magnetic head is fed to the +2 pulse position. If an envelope is not detected at any of the −2, 0 or +2 pulse positions, that track is judged to be blank.

Figure 6B:
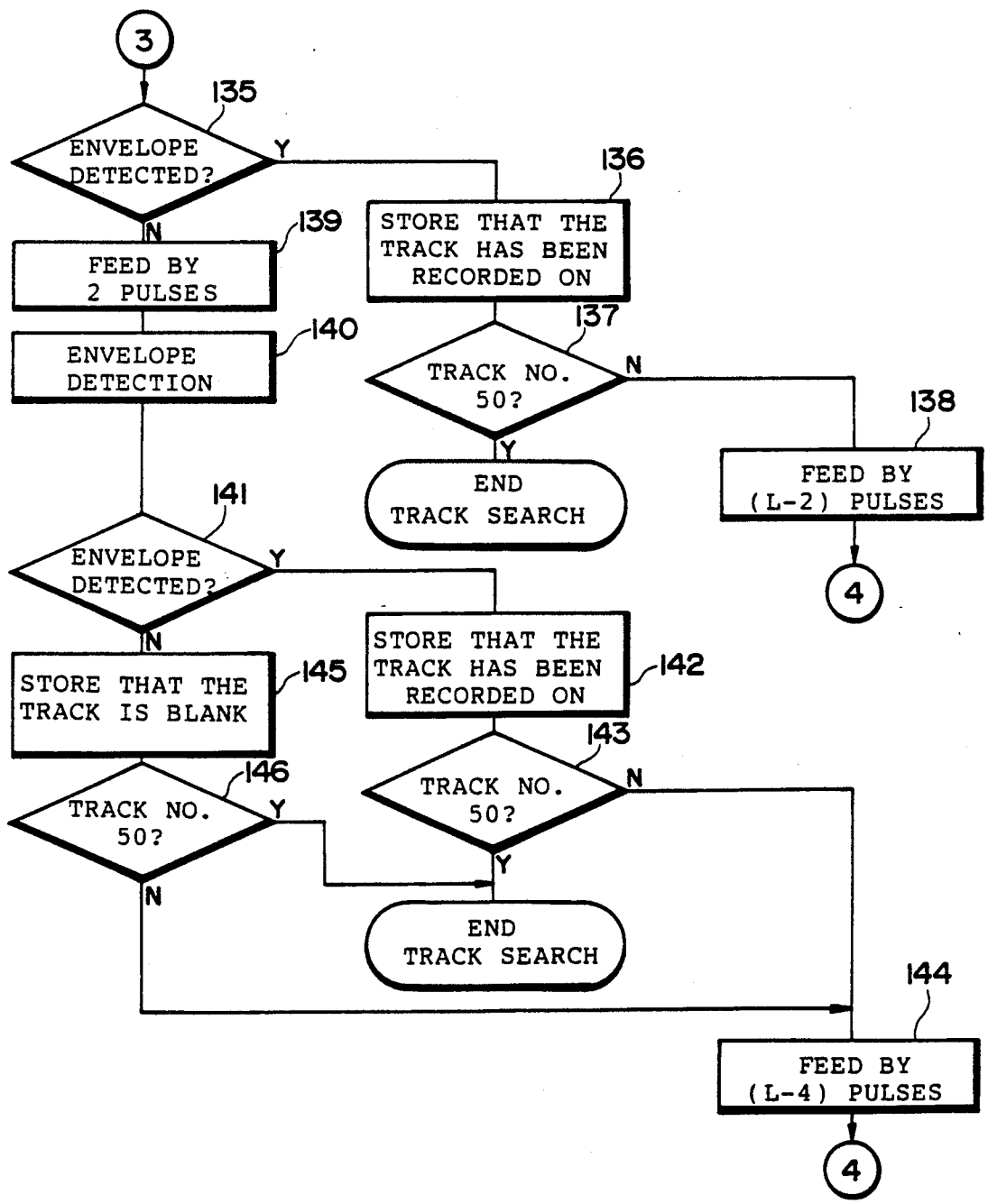

Processing for performing the track search one track at a time using one magnetic head 2 will be described first with reference to FIGS. 6a and 6b. Here it is assumed that L=10 (the number of shift pulses needed to shift the magnetic head by one track pitch).

First, a check is performed to determine, by the home position switch 6, whether the magnetic head 2 is situated at the home position HP (step 125). It is preferred that the magnetic head 2 be returned to the home position in advance when the video floppy 1 is loaded or changed for another. If the magnetic head 2 is not at the home position HP (NO at step 125), then the stepping motor 87 is driven and the magnetic head 2 is fed in the reverse direction until a detection signal is outputted by the home position switch 6 (step 126). If the magnetic head 2 is situated at the home position HP or has been fed to the home position HP, (L−2)-number of shift pulses are applied to the stepping motor 87, so that the magnetic head 2 is fed to the −2 pulse position of track No. 1 (step 127).

The signal read from the video floppy 1 is subjected to envelope detection at every prescribed angle of revolution at the −2 pulse position of track No. 1 (step 128). If an envelope is detected (YES at step 129), then data to the effect that this track has been recorded on is stored in the track map (step 130). In other words, it is judged that this track is a recorded track.

When a track is judged to be a recorded track, it is determined whether this track is track No. 50, namely the last track (step 131). The track number is known by storing the number of pulses applied to the stepping motor 87 from the home position HP. If the magnetic head 2 is situated at track No. 50, the track search is terminated. If the magnetic head 2 is not situated at track No. 50, L pulses are applied to the stepping motor 87. Thereby, the magnetic head 2 is fed to the −2 pulse position of the next inwardly adjacent track. The program then returns to the step 128, at which this track is subjected to envelope detection in the same manner.

If an envelope is not detected at the −2 pulse position (NO at step 129), two pulses are applied to the stepping motor 87 to feed the magnetic head 2 to the absolute track position (0 pulse position) (step 133). Envelope detection is then performed at the absolute track position (step 134). If an envelope is detected (YES at step 135), then data to the effect that this track has been recorded on is stored in the track map (step 136). If this track is not track No. 50 (NO at step 137), (L−2) pulses are applied to the stepping motor 87 to feed the magnetic head 2 to the −2 pulse position of the next radially inwardly adjacent track (step 138).

At the step, 138, (L−2) pulses are applied to the stepping motor 87, and not L pulses as applied at step 132. This is because two shift pulses have already been applied at step 133. Thereafter, the program proceeds to step 128, where envelope detection is performed in the same way. If the magnetic head 2 has arrived at track No. 50 (YES at step 137), track search processing ends.

If an envelope is not detected even at the absolute track position (NO at step 135), the magnetic head 2 is fed radially inward by an additional two pulses and arrives at the +2 pulse position, where envelope detection is performed (steps 139 and 140). If an envelope is detected at this position (YES at step 141), then data to the effect that this track has been recorded on is stored in the track map (step 142). If this track is not track No. 50 (NO at step 143), (L−4) pulses are applied to the stepping motor 87 to feed the magnetic head 2 to the −2 pulse position of the next adjacent track (step 144). The program then returns to step 128. If the track is track No. 50 (YES at step 143), the track search is terminated.

If an envelope is not detected even at the +2 pulse position (NO at step 141), an envelope has failed to be detected at each of the −2, 0 and +2 pulse positions. Accordingly, this track is judged to be blank and data to this effect is stored in the track map (step 145). If this track is track No. 50 (YES at step 146), the track search ends. If the track is not track No. 50, then (L−4) pulses are applied to the stepping motor 87 to feed the magnetic head 2 to the −2 pulse position of the next adjacent track (step 144).

The foregoing processing is executed for all tracks from track No. 1, which is the outermost track, to track No. 50, which is the innermost track, in order to form the track map. If necessary, the track map is transmitted to the system controller 10 and stored in its memory. The magnetic head 2 stops and stands by at track No. 50 or waits for a designation or a decision regarding a track to be recorded on or from which a signal is to be played back.

Figure 7B:
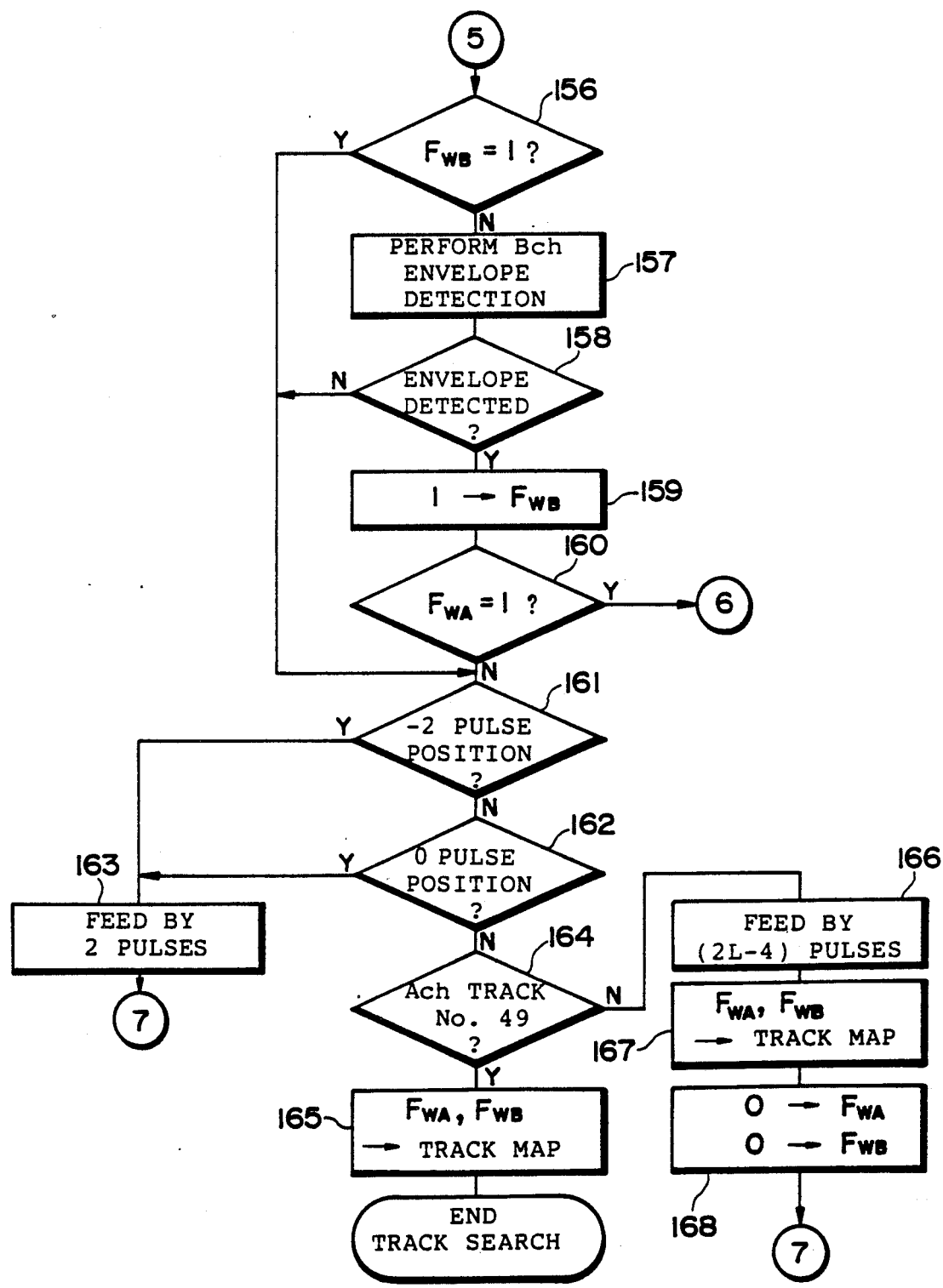
Figure 7C:
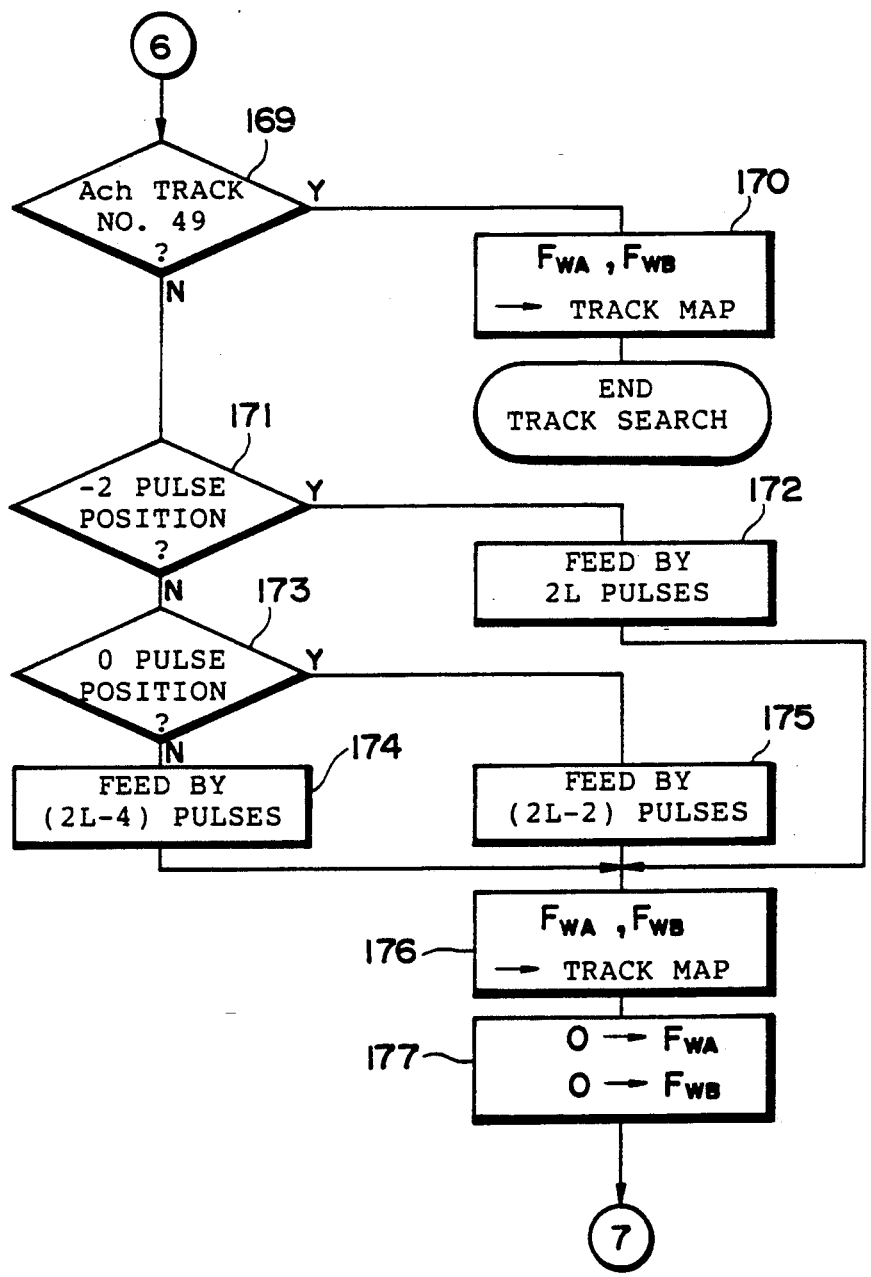

FIGS. 7a through 7c illustrate processing for performing the track search two tracks at a time using two magnetic heads 2. Of the two magnetic heads 2, the radially outer one is an A-channel (abbreviated to Ach) head and the radially inner one is a B-channel (abbreviated to Bch) head. Flags $F_{WA}$ and $F_{WB}$ are used for temporarily storing the results of envelope detection on the Ach and Bch, respectively.

It is determined whether the Ach magnetic head 2 is situated at the home position HP (step 147). If the head is not at this position, the two magnetic heads 2 are fed so as to situate the Ach magnetic head at the home position HP (step 148). When this is done, the Ach and Bch flags FWA, FWB are cleared (step 149) and the stepping motor 87 is supplied with (L−2) pulses. In this way the Ach magnetic head 2 of the two magnetic heads is fed to the −2 pulse position of track No. 1, and the Bch magnetic head 2 is fed to the −2 pulse position of track No. 2 (step 150). At this position, it is determined by the Ach magnetic head whether track No. 1 has been recorded on and by the Bch magnetic head whether the neighboring track No. 2 has been recorded on.

If the Ach flag $F_{WA}$ has been reset to 0 (step 151) (this will usually be 0 at the start of envelope detection at each track), envelope detection at this track is carried out (step 152). When an envelope is detected (YES at step 153), the Ach flag $F_{WA}$ is set to 1 and the fact that an envelope has been detected is stored (step 154). The flag $F_{WB}$ of the track checked by the Bch magnetic head is investigated (step 155). If the Bch flag $F_{WB}$ has been reset to 1 (YES at step 155), the program proceeds to step 169. In a case where $F_{WA} = 1$ is found to hold at step 151, an envelope has already been detected with regard to this track and, hence, the processing of the aforementioned steps 152-155 is skipped.

If the flag $F_{WB}$ of the Bch has been reset to 0 (NO at step 155), the program proceeds to the Bch processing. Here also the status of the flag $F_{WB}$ is examined (step 156). If $F_{WB} = 0$ is found to hold, Bch envelope detection processing is executed in the same manner as the processing of steps 151 to 155. If an envelope is detected, the flag $F_{WB}$ is set to 1. If an envelope is detected, the flag $F_{WB}$ is left reset at 0 (step 157-159). If the Ach flag $F_{WA}$ has been set to 1 (YES at step 160), the program proceeds to step 169. If the Bch flag $F_{WB}$ has been set to 1 (YES at step 156), the processing of steps 157 to 160 is skipped.

When the program proceeds to step 156 in response to a NO answer at step 155, or when a NO decision is rendered at step 160, an envelope has not been detected on at least one of the A and B channels. As a result, it is necessary to feed the magnetic heads 2 to respective ones of the next detection positions of the same track and continue envelope detection processing.

Accordingly, it is checked to see whether the present magnetic head position is the −2 pulse position or the 0 pulse position (absolute track position) (steps 161 and 162). This is carried out by checking the number of pulses applied to the stepping motor 87. If the head position is the −2 pulse position (YES at step 161), two pulses are applied to the stepping motor 87 to feed the two magnetic heads 2 to the respective absolute track positions (step 163). If the head position is the 0 pulse position (YES at step 162), two pulses are applied to the stepping motor 87 to feed the two magnetic heads to respective ones of the +2 positions of each track (step 163). The program then returns to the step 151 so that the processing of steps 151-160 is executed at the respective positions.

If NO decisions are rendered at both steps 161 and 162, the magnetic heads are at the +2 position of the respective tracks. As a result, envelope detection processing regarding each of the two tracks ends. Accordingly, it is checked to see whether the Ach magnetic head is at track No. 49 (whether the Bch magnetic head is at track No. 50) (step 164). If a NO decision is rendered, (2L−4) pulses are applied to the stepping motor 87 to feed each magnetic head 2 to the −2 pulse position of the respective track neighboring the next track (step 166), and the data of the flags $F_{WA}$ and $F_{WB}$ representing the envelope detection results regarding the previous track is transferred to and stored at the corresponding track area of the track map (step 167). Thereafter, the flags $F_{WA}$ $F_{WB}$ are reset (step 168) and the program returns to step 151 so that envelope detection processing similar to that described above is executed with regard to the new tracks after feed of the heads.

When the Ach envelope has been detected (a YES decision is rendered at step 153 and $F_{WA} = 1$ is set at step 154) and the Bch flag $F_{WB}$ has been set to −1 (YES at step 155), or when the Bch envelope has been detected (a YES decision is rendered at step 158 and $F_{WB} = 1$ is set at step 159) and the Ach flag $F_{WA}$ has been set to −1 (YES at step 160), envelopes have been detected at both the Ach and Bch tracks. Therefore, regardless of the positions of the magnetic heads, processing with respect to these tracks ends and it is necessary to feed the magnetic heads 2 to the respective ones of the tracks next to be processed. Accordingly, a check is performed to determine whether the track at which the Ach magnetic head 2 is situated is track No. 49 (step 169). If this track is not track No. 49, it is checked to see whether each magnetic head 2 is at the −2 pulse position (step 171) or the 0 pulse position (step 173) of its respective track. If it is at the −2 pulse position, 2L pulses are applied to the stepping motor 87. If the magnetic heads 2 are at their respective 0 pulse positions, (2L−2) pulses are applied to the stepping motor 87. If the magnetic heads are neither at the −2 pulse positions nor the 0 pulse positions, the magnetic heads are at the respective +2 pulse positions (NO at steps 171 and 173) and, hence, (2L−4) pulses are applied to the stepping motor 87 to feed each magnetic head 2 to the −2 pulse position of the respective track neighboring the track next to the one, at which the head is presently located (steps 172, 174 and 175). Concurrently, the contents of flags $F_{WA}$ and $F_{WB}$ are transferred to and stored in the corresponding track areas of the track map (step 176). Thereafter, the Ach flag $F_{WA}$ and the Bch flag $F_{WB}$ are reset to 0 (step 177) and the program returns to step 151. Envelope detection processing is performed, just as described above, with regard to the tracks to which the magnetic heads are fed.

By repeating the foregoing processing, the two magnetic heads are fed radially inward two tracks at a time until track Nos. 49 and 50 are reached. When the prescribed processing ends at these tracks, a YES decision is rendered at step 164 or 169. The states of flags $F_{WA}$, $F_{WB}$, which indicate the results of envelope detection processing at track Nos. 49 and 50, are stored at the No. 49 and No. 50 areas of the track map (steps 165 and 170), and track search processing is terminated.

(3) Peak Position Detection Processing

As set forth above, the recording of the still-video signal on the video floppy 1 is performed by positioning the magnetic head 2 on the absolute track position in accordance with the absolute track address system. On the other hand, the video floppy 1 undergoes expansion and contraction due to changes in the environment, particularly changes in temperature and humidity. Accordingly, there are occasions where some deviation or offset occurs between the center of a recorded track and the absolute track position on the video floppy 1.

In playing back a still-video signal, it is desired that the best signal having little noise be read from the video floppy. In order to achieve this, it is necessary that the center of the magnetic head be made to coincide with the center of the portion of the video floppy on which the signal is actually recorded. Accordingly, with regard to a recorded track on the video floppy, it is required to execute processing for detecting the peak position of the envelope of the read signal obtained when the magnetic head is fed in the diametric direction (i.e., across the track). This is referred to as "peak position detection processing". Accordingly, peak position detection processing is executed in the playback mode when a track to be played back (or erased) is decided by the forward switch 92, the reverse switch 93 or the track No. designating switch 95 of the playback device 90. The magnetic head first is positioned at the absolute track position of the relevant track and peak position detection processing is performed about this position.

Peak position detection processing described in detail hereinbelow involves several general principles, which will now be set forth.

(A) Gain of the envelope detector circuit 83

(a1) The gain is raised in advance.
(a2) The gain is lowered at saturation.

Since envelope detection is performed upon raising the gain of the envelope detector circuit 83, there are occasions where the circuit 83 saturates (as when the A/D converter circuit 112 overflows). In peak position detection processing, the envelope signal is subjected to a level comparison. This level comparison is not carried out when saturation occurs. Accordingly, the gain of the circuit 83 is lowered to make level comparison possible.

(B) Feed of the magnetic head (b1) The peak position detection range is limited to the range from the −3 pulse position to the +3 pulse position.

It can be expected that the peak position will fall within a range of +30 μm about the absolute track position as center.

(b2) The number of pulse feed operations within the abovementioned range is limited to m=6.

This is to prevent peak position detection processing from continuing without restriction. It can be expected that a peak will be found sometime during the six feeds of the magnetic head (the head will be fed +10 μm or −10 μm per feed).

(b3) Feed starts from the −2 pulse position.

In consideration of the limitations (b1) and (b2) above, it is appropriate to start the peak position detection processing from a position −20 μm away from the absolute track position, which serves as the reference.

(C) Deciding the peak position (c1) When the peak of an envelope level is found, that position is adopted as the peak position, which is obvious.

(c2) If a peak is not found, the final feed position decided by limitation (b1) or (b2) is compulsorily adopted as the peak position.

It is expected that a peak will lie within the range between the −3 pulse position and the +3 pulse position.

(c3) When an envelope cannot be detected (inclusive of a case where an envelope having a level required for peak detection processing cannot be detected), the absolute track position is adopted as the peak position.

Peak position detection processing is performed with regard to a track judged to be a recorded track in the foregoing track search processing. Accordingly, peak position detection processing is premised on the fact that a signal has been recorded on the track, so that playback of the signal can be expected in the playback mode. Failure to detect an envelope in peak position detection processing can be ascribed to an error or some other cause (e.g., poor head contact, recording of a signal, such as an audio signal, which is not a video signal, etc.). However, since it is predetermined to proceed to playback processing after peak position detection processing, at all events the magnetic head must be positioned in order to allow playback. Accordingly, in a case such as this, the absolute track position is adopted as the peak position. In this way the peak position can be decided and, moreover, it can be expected that no impediments will arise.

FIGS. 8a through 8e illustrate typical examples of changes in envelope level detected when the magnetic head 2 is fed across a track.

Figure 8A:
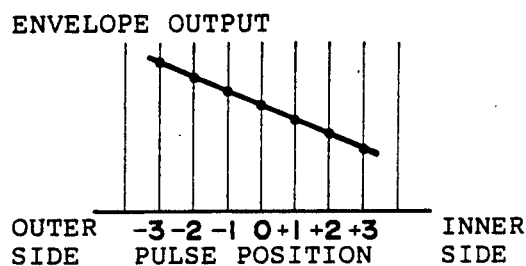
FIGS. 8a through 8e are examples of changes in the envelope level.

FIG. 8a illustrates an example in which an envelope level diminishes monotonously in the radially inward direction of the floppy. In this case, the value of the envelope at the −2 pulse position is read first, then the magnetic head 2 is fed forward by the +1 pulse and the value of the envelope at the −1 pulse position is read. The values of the envelope at the −2 pulse position and the −1 pulse position are compared. Since the value of the envelope at the −2 pulse position is higher, the magnetic head 2 is fed in the reverse direction. Finally, the values of the envelope at the −2 pulse position and −3 pulse position are compared. Because the value of the envelope at the −3 pulse position is higher and the −3 pulse position is a limit position on the radially outer side of the peak position detection range [the abovementioned limitation (b1)], it is decided that the peak position is the −3 pulse position [the abovementioned definition (c2)].

Figure 8B:
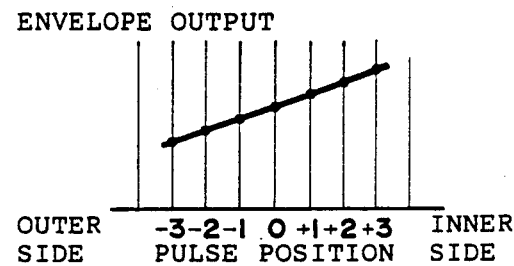

FIG. 8b illustrates an example in which an envelope level increases monotonously in the radially inward direction of the floppy. Here it is discriminated that the envelope level increases in the radially inward direction of the floppy as the magnetic head 2 is fed successively in the forward direction, with the magnetic head eventually arriving at the +3 pulse position. Because this position is a limit position on the radially inner side of the peak position detection range [the abovementioned limitation (b1)], it is decided that the peak position is the +3 pulse position [the abovementioned definition (c2)].

Figure 8C:
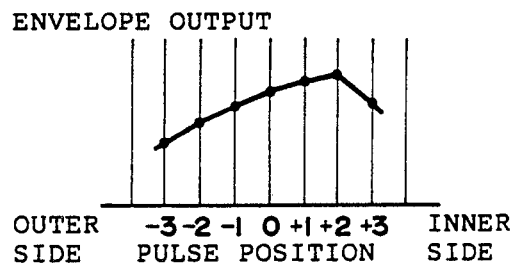
Figure 8D:
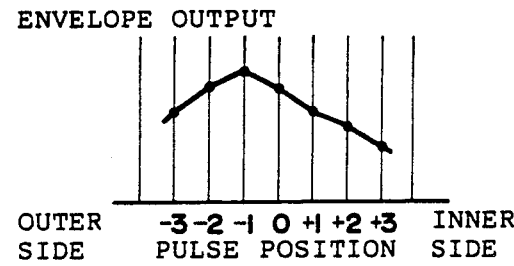

FIGS. 8c and 8d illustrate examples in which the peak position resides in a range between the −3 pulse position and the +3 pulse position.

In the example of FIG. 8c, the envelope level increases radially inward of the floppy and the magnetic head 2 is thereby fed radially inward of the floppy. When the magnetic head 2 arrives at the +3 pulse position, the value of the envelope at this position is lower than the value at the +2 pulse position, so that the magnetic head is fed reversely to the +2 pulse position. Since this falls under the limited number of feed operations (m = 6 times) [the aforementioned limitation (b2)], it is decided that the +2 pulse position is the peak position [the aforementioned (c2)].

In the example illustrated in FIG. 8d, the magnetic head 2 is fed successively from the −2 pulse position to the 0 pulse position. Since the envelope value is declining at the 0 position, the magnetic head 2 is next fed reversely to the −1 pulse position and it is decided that the −1 pulse position is the peak position [(c1)].

Figure 8E:
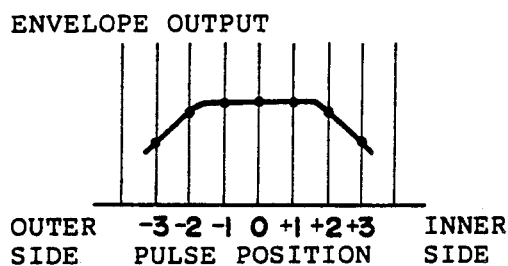

In the example illustrated in FIG. 8e, the peak resides between the −3 pulse position and the +3 pulse position, but the peak shape of the envelope is not maintained and a plurality of pulse positions having equal levels exit. In this case, the magnetic head 2 is fed successively in the radially inward direction from the −2 pulse position (when the values of the envelope at two adjacent pulse positions are equal, the values are regarded to be increasing in the radially inward direction, as will be illustrated later), and it is decided that the +1 pulse position is the peak position according to the criterion (c1), just as in the case of FIG. 8d. In a case such as this, there are occasions where the peak position is decided in accordance with limitation (b2) and criterion (c2).

Figure 9B:
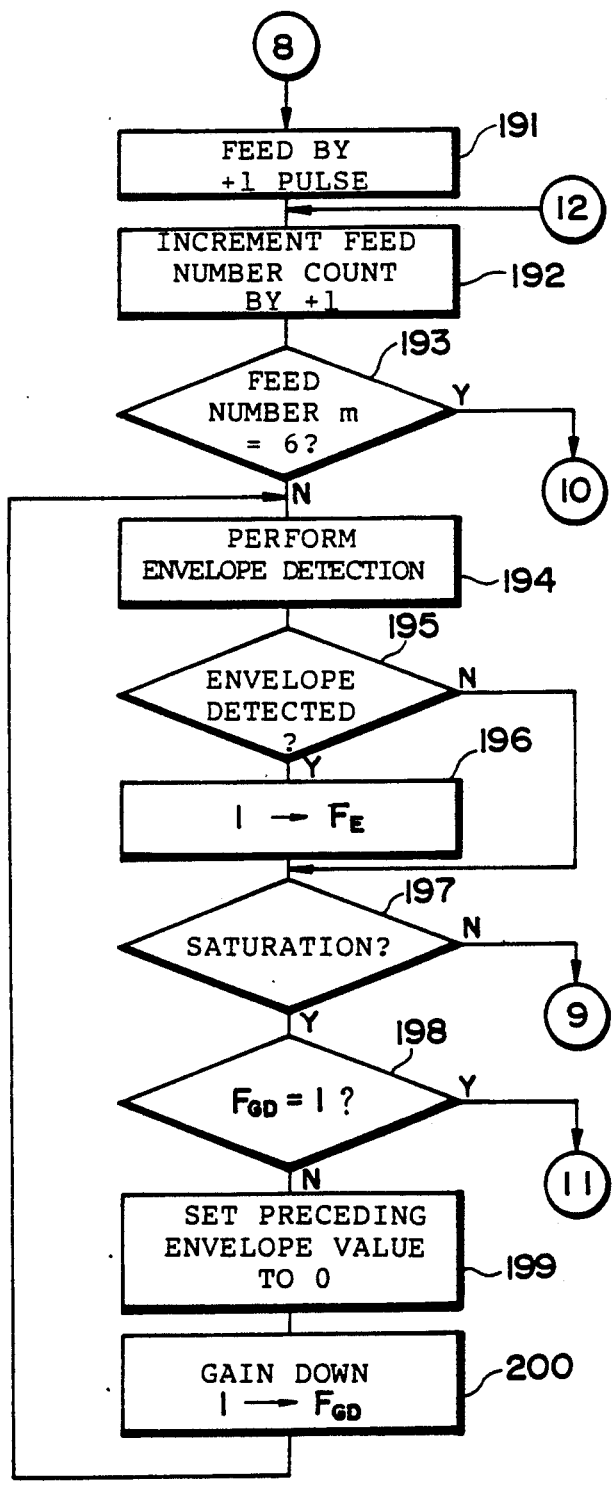
Figure 9C:
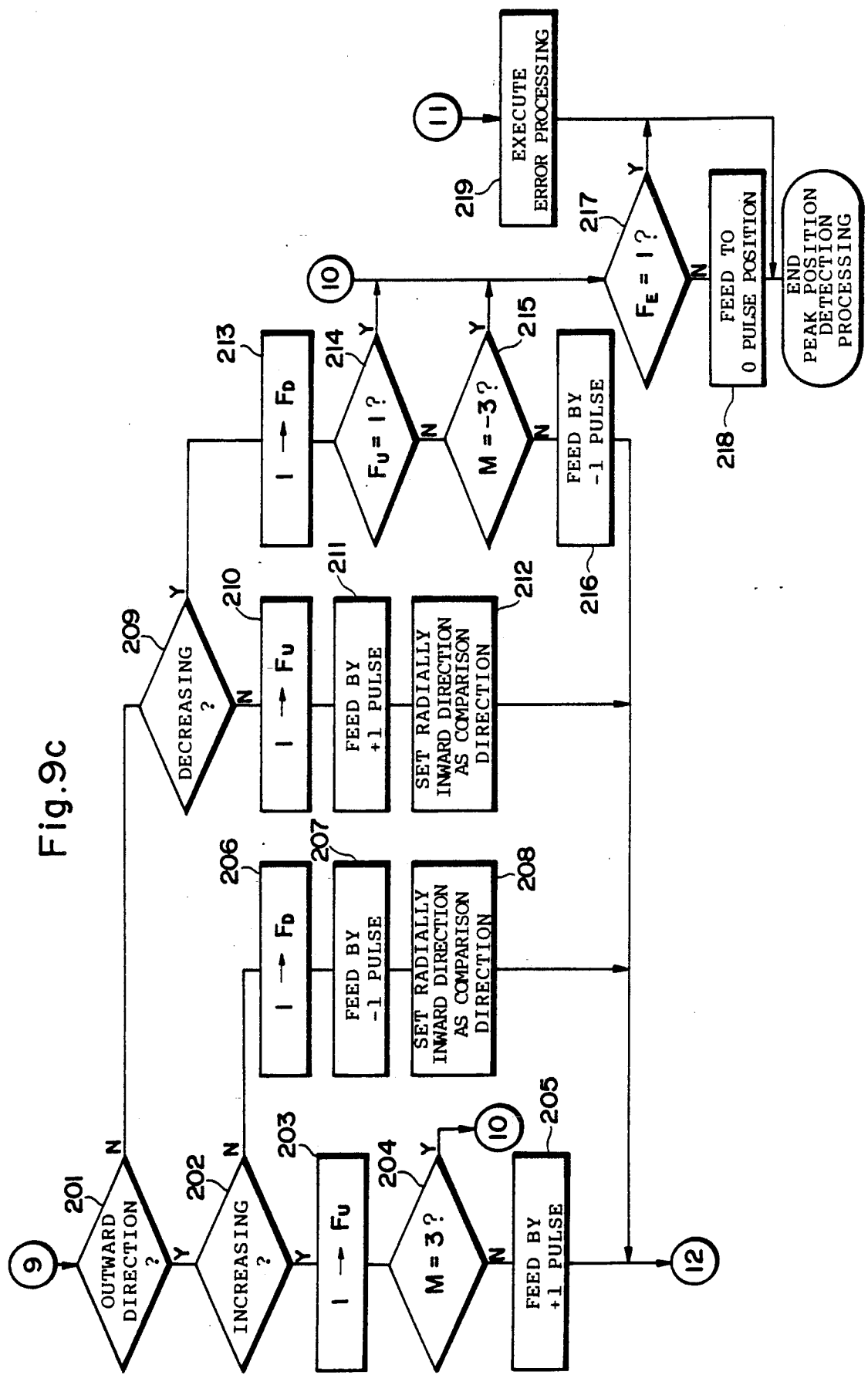

FIGS. 9a through 9c illustrate the procedure for peak position detection processing. Before discussing this processing, the terminology, flags and a counter used in this processing will be described.

The comparison of envelope values is performed between two mutually adjacent pulse positions. When the relation the envelope value at the radially outward pulse position)≦(the envelope value at the radially inward pulse position) holds, the envelope value is has increased, and an UP flag $F_U$ is set at this time. When the relation (the envelope value at the radially outward pulse position)>(the envelope value at the radially inward pulse position) holds, the envelope value has decreased, and a DOWN flag $F_D$ is set. In addition to the foregoing flags, there is a gain-down flag $F_{GD}$ which stores the fact that the gain of the envelope detector circuit 83 has been lowered, and an envelope detection flag $F_E$, which is set when an envelope whose level is higher than that required by peak position detection processing is detected.

A +1 pulse feed moves; the magnetic head 2 in the forward direction (radially inward) by an amount (10 μm) equivalent to one pulse, and a −1 pulse feed moves the magnetic head 2 in the reverse direction (radially outward) by an amount (10 μm) equivalent to one pulse. Take-up of backlash in the feed mechanism of the feed drive controller is executed in the −1 pulse feed. The number of feeds refers to the number which is incremented by +1 when the head is fed by one pulse, irrespective of whether the feed is +1 pulse feed or the −1 pulse feed. The number of feeds is counted by a counter. The positions (−3, −2, −1, 0, +1, +2 and +3 pulse positions) of the magnetic head 2 are judged by increasing or decreasing the pulses, which are applied to the stepping motor 87, in accordance with the feed direction. The numeral expressing the pulse position is represented by M(−3∼+3).

Peak position detection processing will now be described with reference to FIGS. 9a through 9c. First, all of the flags $F_{GD}$, $F_U$, $F_D$ and $F_E$ are cleared to 0 (step 180), then the gain of the envelope detector circuit 83 is raised (step 181).

As set forth above, peak position detection processing is performed in the playback mode, and the magnetic head 2 is positioned at the absolute track position of the designated track before this processing. The magnetic head 2 is fed from this absolute track position to the −2 pulse position of this track (step 182).

Envelope detection is carried out next (step 183). If an envelope is detected, the envelope detection flag $F_E$ is set to 1 and the detected envelope value is stored in a memory or a register (step 185). When an envelope is not detected, the processing of step 185 is skipped. A check is made to determine whether the detected envelope is in the saturated state (step 186). In case of saturation, the gain of the envelope detector circuit 83 is lowered, and the gain-down flag $F_{GD}$ is set to 1 (step 188), if the gain of the circuit 83 has not been lowered already (NO at step 187). Envelope detection is then performed again (steps 183–188).

If the saturated state still prevails even though the gain-down processing has been executed (YES at step 187), the display unit 21 is made to present an error display, which indicates an abnormality or the fact that peak position detection is impossible (step 219), and peak position detection processing is terminated. Normally, the gain of the envelope detector circuit 83 whose gain has been turned down is set to a degree at which saturation will not occur.

If the detected envelope is not saturated (NO at step 186), the direction of comparison is set radially outward. In other words, the fact that the direction of comparison is the radially outward direction is stored in memory or in a register (step 189). The direction of comparison is the radially outward direction corresponds to envelope value comparison processing, where the value of the envelope at the particular pulse position is compared with the envelope value at the neighboring pulse position located on the radially outer side. Thereafter, the counter which counts the number of feed operations is cleared. In other words, the value of the count recorded by the counter is made 0 (step 190).

The magnetic head 2 is fed by the +1 pulse (step 191) and the count recorded by the feed number counter is incremented (step 192). Now a check is made to determine whether the number of feed operations of the magnetic head 2 has attained the aforementioned limit of m=6. If the limit has not been attained (NO at step 193), envelope detection is performed at this new pulse position in the same manner as at steps 183-187 (steps 194–198). When saturation has been attained but the gain still has not been reduced, gate-down processing is executed (step 200). However, the envelope value detected and stored earlier at step 194 or step 183 is a value detected in the gain-up state. Therefore, when this value is compared with the envelope value to be detected now upon reducing the gain, there is a good possibility that the earlier value will be judged to be higher. Originally, however, saturation does not occur with the earlier envelope detection performed at the same gain, but saturation does occur with the envelope detection performed now. When the two values are compared, therefore, the presently prevailing envelope detection value must be judged to be higher. Accordingly, the earlier (preceding) envelope value to be compared with the present envelope value is made 0 compulsorily (step 199), whereby it becomes possible to render the decision to the effect that the present envelope value is higher when the comparison is made. If the gain is found to have already been reduced upon attainment of the saturated state, error processing is executed, as set forth above (YES at step 198, followed by step 219).

If the detected envelope value has not saturated (NO at step 197), then the program proceeds to comparison processing from step 201 onward.

First, it is determined whether the direction of the comparison is in the radially outward direction (step 201). The fact that the direction of comparison is the radially outward direction involves comparing the preceding envelope value with the envelope value at the present pulse position for the value at the neighboring pulse position on the radially outer side. Hence, an increase is judged if the present value is equal or greater, and a decrease is judged if the present value is smaller (step 202). If an increase is judged, the UP flag $F_U$ is set to 1 (step 203), and the magnetic head 2 is fed by +1 pulse feed (step 205) in order to determine whether the tendency is for a further increase. The program then returns to step 192 and envelope detection is performed at the next pulse position adjacent on the radially inner side.

If the magnetic head 2 is fed successively in the radially inward direction and happens to arrive at the +3 pulse position by continuous execution of the decision of step 202 (this corresponds to the case illustrated in FIG. 8b) (YES at step 204), the envelope detection flag $F_E$ is examined (step 217). If the flag $F_E$ has been set to 1, this position is decided to be the peak position. In other words, the magnetic head 2 is positioned at the peak position decided.

A case is also conceivable in which the envelope detection flag $F_E$ is reset to 0. Specifically, even if an envelope is not detected (NO at steps 184 and 195), the step for setting the flag $F_E$ to 1 is merely skipped, and the envelope value at this time is 0. The reason for this is that an increase is determined at step 202 even if the envelope values at the two pulse positions to be compared are both 0. In this case, the magnetic head 2 is fed to the absolute track position, with the absolute track position serving as the peak position, in accordance with the aforementioned principle (c3) (step 218).

When a decrease is determined at step 202, the DOWN flag $F_D$ is set to 1 (step 206). In order to find a pulse position having a larger envelope value, the magnetic head 2 is subjected to the −1 pulse feed (feed in the radially outward direction) at step 207, and the radially inward direction is set as the direction of comparison (step 208). This corresponds to a case in which the head moves from the −2 pulse position to the −1 pulse position and then returns to the −2 pulse position in FIG. 8a, a case in which the head returns from the +3 pulse position to the +2 pulse position in FIG. 8c, and a case in which the head returns from the 0 pulse position to the −1 pulse position in FIG. 8d. Setting the radially inward direction as the direction of the comparison involves making a comparison with the envelope at the neighboring pulse position on the radially inner side in the next envelope value comparison processing step. Thereafter, the program proceeds to envelope detection processing from step 192 onward.

Because the direction of the comparison is the radially inward direction and not the radially outward direction at step 201, the preceding envelope value compared with the envelope value at the present pulse position is the value at the neighboring pulse position on the radially inner side. Accordingly, an increase is determined if the present value is equal or less, and a decrease is judged if the present value is greater (step 209).

In the case of an increase, the UP flag $F_U$ is set to 1 (step 210), the magnetic head 2 is fed by +1 pulse (step 211), and the direction of the comparison is set to the radially outward direction (step 212). Thereafter, envelope detection processing from step 192 onward is executed.

In the case of a decrease, the DOWN flag $F_D$ is set (step 213) and it is checked to see whether the UP flag $F_U$ has already been set (step 214). For instance, in the example of FIG. 8d, the UP flag $F_U$ is set when the head is fed from the −2 pulse position to the −1 pulse position. The magnetic head 2 subsequently is fed up to the 0 pulse position, at which a decrease is determined. As a result, the head is returned to the −1 pulse position by the processing of steps 206-208. Since a decrease is again judged at the −1 pulse position, a YES decision is rendered at step 209 and the program arrives at step 214 via step 213. When a YES decision is rendered at the step 214, this position is the peak position (in general, a YES decision is rendered also at step 217), so that the magnetic head 2 is positioned at this position.

If a NO decision is rendered at the step 214, it is checked to see whether the head has arrived at the −3 pulse position (step 215). In this case, the −3 pulse position is decided to be the peak position which corresponds to the case of FIG. 8a.

In order to feed the magnetic head radially outward to a further degree if the position is not the −3 pulse position, the −1 pulse feed processing is performed (step 216) and the program returns to the step 192.

If the value in the feed number counter establishes the condition m=6 by repeated execution of the processing steps 201-216 and 192-197, the final position is decided to be the peak position which corresponds to the case of FIG. 8c.

Though the gain of the envelope detector is switched between two stages in the foregoing embodiment, an arrangement is possible in which changeover is capable of being made among three or more stages, wherein the gain-down processing of steps 188 and 200 would be executed a plurality of times.

As many apparently widely different embodiments of the present invention can be made without departing from the spirit and scope thereof, it is to be understood that the invention is not limited to the specific embodiments thereof except as defined in the appended claims.

What is claimed is:

1. A method of detecting a peak position in a magnetic playback apparatus, comprising the steps of:
   (a) determining an absolute track position as a distance from a magnetic head of the magnetic play back apparatus to a reference position;
   (b) determining a search range using said absolute track position of a magnetic recording medium as a reference;
   (c) executing a track search processing on each track of said magnetic recording medium for determining whether each track is a recorded track or a blank track;
   (d) developing a track map having results from said track search processing at said step (c);
   (e) determining an upper limit on a number of times said magnetic head is fed to a plurality of detection positions within said search range;
   (f) starting a peak position detection processing from one of said tracks determined at said step (c) to be a recorded track within said search range;
   (g) examining the peak position by detecting an envelope of a read signal of the magnetic head at each detection position while the magnetic head is fed diametrically of the magnetic recording medium and, moreover, comparing detected envelopes at neighboring detection positions;
   (h) determining a position at which one of said detected envelopes is a maximum position to be the peak position when said maximum position is detected by the time the number of times the magnetic head is fed attains said upper limit; and (i) adopting a final position to which the magnetic head is fed to be a pseudo-peak position when said peak position fails to be decided by the time the number or times the magnetic head is fed attains the upper limit, or when the magnetic head reaches a limit of the search range.

2. The method according to claim 1 further comprising the step of determining the absolute track position to be the peak position when said detected envelopes fail to be within said search range.

3. A method of detecting a peak position in a magnetic playback apparatus, comprising the steps of:
    (a) determining an absolute track position as a distance from a magnetic head of the magnetic playback apparatus to a reference position;
    (b) determining a search range using said absolute track position of a magnetic recording medium as a reference;
    (c) executing a track search processing on each track of said magnetic recording medium for determining whether each track is a recorded track or a blank track;
    (d) developing a track map having results from said track search processing at said step (c);
    examining the peak position by detecting an envelope of a read signal of a magnetic head at each detection position while the magnetic head is fed diametrically of the magnetic recording medium within said range and, moreover, comparing detected envelopes at neighboring detection positions within said range; and
    (e) determining said absolute track position to be the peak position when said detected envelopes fail to be within said search range.

4. The method according to claim 1, wherein said track search processing is executed for at least one of the conditions when said magnetic recording medium is loaded in the magnetic playback apparatus, when said magnetic recording medium is exchanged for another magnetic recording medium, and when a power supply of the magnetic recording apparatus is turned on.

5. The method according to claim 1, wherein said track search processing at said step (c) further comprises the steps of:
    (1) determining a plurality of absolute detection positions near the absolute track position of the magnetic recording medium;
    (2) detecting an absolute envelope of said read signal of the magnetic head at each absolute detection position while the magnetic head is fed diametrically of the magnetic recording medium;
    (3) determining said track to be said recorded track when the absolute envelope is detected at one position among the plurality of absolute detection positions without executing the absolute envelope detection at the remaining absolute detection positions associated with said track;
    (4) determining said track to be said blank track when the absolute envelope fails to be detected at any of the plurality of absolute detection positions associated with said track; and
    (5) feeding the magnetic head to the next track after one of said steps (3) and (4).

6. The method according to claim 5, wherein said track is determined to be said recorded track when the absolute envelope exceeds a predetermined threshold level and said track is determined to be said blank track when the absolute envelope fails to attain the predetermined threshold level.

7. The method according to claim 1 further comprising the steps of: arranging an envelope detector circuit for detecting the envelope of said read signal of the magnetic head such that the gain thereof is capable of being changed over between high and low levels;
    raising the gain of the envelope detector circuit when the peak position detection processing is executed; and
    lowering the gain of the envelope detector circuit when the envelope saturates.

8. The method according to claim 1 further comprising the steps of:
    arranging an envelope detector circuit for detecting the envelope of said read signal of the magnetic head such that the gain thereof is capable of being changed over between high and low levels; and
    raising the gain of the envelope detector circuit when the track search processing is executed.

9. The method according to claim 3, wherein said track search processing is executed for at least one of the conditions when said magnetic recording medium is loaded in the magnetic playback apparatus, when said magnetic recording medium is exchanged for another magnetic recording medium, and when a power supply of the magnetic recording apparatus is turned on.

10. The method according to claim 3, wherein said track search processing at said step (c) further comprises the steps of:
    (1) determining a plurality of absolute detection positions near the absolute track position of the magnetic recording medium;
    (2) detecting an absolute envelope of said read signal of the magnetic head at each absolute detection position while the magnetic head is fed diametrically of the magnetic recording medium;
    (3) determining said track to be said recorded track when the absolute envelope is detected at one position among the plurality of absolute detection positions without executing the absolute envelope detection at the remaining absolute detection positions associated with said track;
    (4) determining said track to be said blank track when the absolute envelope fails to be detected at any of the plurality of absolute detection positions associated with said track; and
    (5) feeding the magnetic head to the next track after one of said steps (3) and (4).

11. The method according to claim 10, wherein said track is determined to be said recorded track when the absolute envelope exceeds a predetermined threshold level and said track is determined to be said blank track when the absolute envelope fails to attain the predetermined threshold level.

12. The method according to claim 3 further comprising the steps of:
    arranging an envelope detector circuit for detecting the envelope of said read signal of the magnetic head such that the gain thereof is capable of being changed over between high and low levels;
    raising the gain of the envelope detector circuit when the peak position detection processing is executed; and
    lowering the gain of the envelope detector circuit when the envelope saturates.

13. The method according to claim 3 further comprising the steps of:
   arranging an envelope detector circuit for detecting the envelope of said read signal of the magnetic head such that the gain thereof is capable of being changed over between high and low levels; and
   raising the gain of the envelope detector circuit when the track search processing is executed.

14. A magnetic playback apparatus for detecting a peak position, comprising:
   absolute track determining means for determining an absolute track position as a distance from a magnetic head of the magnetic playback apparatus to a reference position and determining a search range using said absolute track position of a magnetic recording medium as a reference;
   track search processing means for executing a track search processing on each track of said magnetic recording medium for determining whether each track is a recorded track or a blank track and developing a track map having results from said track search processing;
   upper limit determining means for determining an upper limit on a number of times said magnetic head is fed to a plurality of detection positions with said search range;
   peak position detection processing means for initiating a peak position detection processing from one of said tracks determined to be within said search range by said track search processing means and examining the peak position by detecting an envelope of a read signal of said magnetic head at each detection position while the magnetic head is fed diametrically of the magnetic recording medium and comparing detected envelopes at neighboring detection positions; and
   peak position determining means for determining a position at which one of said detected envelopes is a maximum position to be the peak position when said maximum position is detected by the time the number of times said magnetic head is fed attains said upper limit and adopting a final position to which said magnetic head is fed to be a pseudo-peak position when said peak position fails to be decided by the time the number of times said magnetic head is fed attains said upper limit or when said magnetic head reaches a limit of said search range.

15. The magnetic playback apparatus according to claim 14, wherein said absolute track determining means determines said absolute track position to be said peak position when said detected envelopes fail to be within said search range.

16. The magnetic playback apparatus according to claim 14, wherein said track search processing means executes at least one of the conditions when said magnetic recording medium is loaded in the magnetic playback apparatus, when said magnetic recording medium is exchanged for another magnetic recording medium and when a power supply of the magnetic recording apparatus is turned on.

17. The magnetic playback apparatus according to claim 14, wherein said track search processing means further comprises:
   absolute detection positions determining means for determining a plurality of absolute detection positions near said absolute track positions of said magnetic recording medium;
   absolute envelope detecting means for detecting an absolute envelope of said read signal of said magnetic head at each absolute detection position while said magnetic head is fed diametrically of said magnetic recording medium;
   track condition determining means for determining said track to be said recorded track when said absolute envelope is detected at one position among said plurality of absolute detection positions without executing said absolute envelope detection at the remaining absolute detection positions associated with said track and determining said track to be said blank track when said absolute envelope fails to be detected at any of said plurality of detection positions association with said track; and
   feeding means for feeding said magnetic head to the next track after performing said track condition determining means for one of said tracks.

18. The magnetic playback apparatus according to claim 17, wherein said track condition determining means determines said track to be said recorded track when said absolute envelope exceeds a predetermined threshold level and determines said track to be said blank track when said absolute envelope fails to attain said predetermined threshold level.

19. The magnetic playback apparatus according to claim 17, further comprising:
   an envelope detector circuit for detecting said envelope of said read signal of said magnetic head such that the gain thereof is capable of being changed over between high and low levels;
   means for raising the gain of said envelope detector circuit when said peak position detection processing is executed; and
   means for lowering the gain of said envelope detector circuit when the envelope saturates.

20. The magnetic playback apparatus according to claim 14, further comprising;
   an envelope detector circuit for detecting said envelope of said read signal of said magnetic head such that the gain thereof is capable of being changed over between high and low levels; and
   means for raising the gain of said envelope detection circuit when said track search processing is executed.

21. A magnetic playback apparatus for detecting a peak position, comprising:
   absolute track determining means for determining an absolute track position as a distance from a magnetic head of the magnetic playback apparatus to a reference position and determining a search range using said absolute track position of a magnetic recording medium as a reference;
   track search processing means for executing a track search processing on each track of said magnetic recording medium for determining whether each track is a recorded track or a blank track and developing a track map having results from said track search processing;
   peak position detection processing means for examining the peak position by detecting an envelope of a read signal of said magnetic head at each detection position while the magnetic head is fed diametrically of the magnetic recording medium and comparing detected envelopes at neighboring detection positions; and
   peak position determining means for determining said absolute track position to be the peak position when said detected envelopes fails to be within said search range.

22. The magnetic playback apparatus according to claim 21, wherein said track search processing means executes at least one of the conditions when said magnetic recording medium is loaded in the magnetic playback apparatus, when said magnetic recording medium is exchanged for another magnetic recording medium and when a power supply of the magnetic recording apparatus is turned on.

23. The magnetic playback apparatus according to claim 21, wherein said track search processing means further comprises:
absolute detection positions determining means for determining a plurality of absolute detection positions near said absolute track positions of said magnetic recording medium;
absolute envelope detecting means for detecting an absolute envelope of said read signal of said magnetic head at each absolute detection position while said magnetic head is fed diametrically of said magnetic recording medium;
track condition determining means for determining said track to be said recorded track when said absolute envelope is detected at one position among said plurality of absolute detection positions without executing said absolute envelope detection at the remaining absolute detection positions associated with said track and determining said track to be said blank track when said absolute envelope fails to be detected at any of said plurality of detection positions association with said track; and
feeding means for feeding said magnetic head to the next track after performing said track condition determining means for one of said tracks.

24. The magnetic playback apparatus according to claim 23, wherein said track condition determining means determines said track to be said recorded track when said absolute envelope exceeds a predetermined threshold level and determines said track to be said blank track when said absolute envelope fails to attain said predetermined threshold level.

25. The magnetic playback apparatus according to claim 21, further comprising:
an envelope detector circuit for detecting said envelope of said read signal of said magnetic head such that the gain thereof is capable of being changed over between high and low levels;
means for raising the gain of said envelope detector circuit when said peak position detection processing is executed; and
means for lowering the gain of said envelope detector circuit when the envelope saturates.

26. The magnetic playback apparatus according to claim 21, further comprising:
an envelope detector circuit for detecting said envelope of said read signal of said magnetic head such that the gain thereof is capable of being changed over between high and low levels; and
means for raising the gain of said envelope detection circuit when said track search processing is executed.

* * * * *